(12) United States Patent
Lee et al.

(10) Patent No.: US 10,661,632 B2
(45) Date of Patent: May 26, 2020

(54) HEAT PUMP SYSTEM FOR VEHICLE

(71) Applicant: HANON SYSTEMS, Daejeon (KR)

(72) Inventors: Hae Jun Lee, Daejeon (KR); Jae Chun Ryu, Daejeon (KR); Yong Nam Ahn, Daejeon (KR); Sung Je Lee, Daejeon (KR); Se Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 90 days.

(21) Appl. No.: 15/305,184

(22) PCT Filed: Jun. 30, 2015

(86) PCT No.: PCT/KR2015/006686
§ 371 (c)(1),
(2) Date: Oct. 19, 2016

(87) PCT Pub. No.: WO2016/017939
PCT Pub. Date: Feb. 4, 2016

(65) Prior Publication Data
US 2017/0129309 A1    May 11, 2017

(30) Foreign Application Priority Data

Jul. 31, 2014  (KR) .................. 10-2014-0098072
Apr. 29, 2015  (KR) .................. 10-2015-0060586
Apr. 29, 2015  (KR) .................. 10-2015-0060594

(51) Int. Cl.
*F25B 25/00*       (2006.01)
*B60H 1/00*        (2006.01)
(Continued)

(52) U.S. Cl.
CPC .......... *B60H 1/00921* (2013.01); *F25B 6/02* (2013.01); *F25B 30/02* (2013.01);
(Continued)

(58) Field of Classification Search
CPC . F24F 3/052; B60H 1/00921; B60H 1/00885; B60H 2001/00928;
(Continued)

(56) References Cited

U.S. PATENT DOCUMENTS

| 2014/0075973 | A1* | 3/2014 | Graaf ................ | B60H 1/00328 62/115 |
| 2014/0124159 | A1* | 5/2014 | Kim .................. | B60H 1/32 165/42 |
| 2015/0202986 | A1* | 7/2015 | Hatakeyama ........... | B60H 1/22 165/287 |

FOREIGN PATENT DOCUMENTS

| JP | S5984615 A | 5/1984 |
| JP | 2002067676 A | 3/2002 |

(Continued)

OTHER PUBLICATIONS

International Search Report dated Sep. 30, 2015 from International Patent Application Serial No. PCT/KR2015/006686 (with English Translation of International Search Report).

*Primary Examiner* — David J Teitelbaum
(74) *Attorney, Agent, or Firm* — Dickinson Wright PLLC

(57) ABSTRACT

Disclosed herein is a heat pump system for a vehicle, which includes a compressor, an air-cooled condenser mounted on a warm air passageway, expansion means and an evaporator mounted on a cold air passageway of an air-conditioning case in order to carry out heating and cooling and further includes a water-cooled condenser mounted on a refrigerant circulation line between the compressor and the air-cooled condenser to exchange heat between refrigerant and coolant, thereby reducing the number and the size of blowers and the size of the entire system because the size of the air-cooled condenser inside the warm air passageway is reduced, and decreasing power consumption and noise by reducing capacity of a motor of the blower.

23 Claims, 17 Drawing Sheets

(51) Int. Cl.
    *F25B 30/02*    (2006.01)
    *F25B 6/02*     (2006.01)
    *F24F 3/052*    (2006.01)

(52) U.S. Cl.
    CPC .............. *B60H 1/00885* (2013.01); *B60H 2001/00928* (2013.01); *F24F 3/052* (2013.01); *F25B 25/005* (2013.01); *F25B 2339/0441* (2013.01); *F25B 2400/0413* (2013.01); *F25B 2400/16* (2013.01)

(58) Field of Classification Search
    CPC ...... F25B 2339/0441; F25B 2400/0413; F25B 2400/16; F25B 6/02; F25B 30/02; F25B 25/005
    See application file for complete search history.

(56) References Cited

FOREIGN PATENT DOCUMENTS

| | | |
|---|---|---|
| JP | 2003097857 A | 4/2003 |
| JP | 2004053168 A | 2/2004 |
| JP | 2009192155 A | 8/2009 |
| JP | 2010013044 A | 1/2010 |
| JP | 2012232730 A | 11/2012 |
| JP | 2014061876 A | 4/2014 |
| JP | 2014061877 A | 4/2014 |
| KR | 201998029442 U | 8/1998 |
| KR | 20040093632 A | 11/2004 |
| KR | 101222590 B1 | 1/2013 |
| KR | 101339226 B1 | 12/2013 |
| KR | 20140001410 A | 1/2014 |
| WO | WO2013121844 A1 | 8/2013 |

\* cited by examiner

PRIOR ART

PRIOR ART

HEAT PUMP SYSTEM FOR VEHICLE

CROSS-REFERENCE TO RELATED APPLICATIONS

This application is a U.S. National Stage of International Application No. PCT/KR2015/006686, filed Jun. 30, 2015, which claims the benefit and priority of KR 10-2014-0098072 filed Jul. 31, 2014, KR 10-2015-0060586 filed Apr. 29, 2015 and KR 10-2015-0060594 filed Apr. 29, 2015. The entire disclosures of each of the above applications are incorporated herein by reference.

TECHNICAL FIELD

The present invention relates to a heat pump system for a vehicle, and more particularly, to a heat pump system for a vehicle, which includes a compressor, an air-cooled condenser mounted on a warm air passageway, expansion means and an evaporator mounted on a cold air passageway of an air-conditioning case in order to carry out heating and cooling and further includes a water-cooled condenser mounted on a refrigerant circulation line between the compressor and the air-cooled condenser to exchange heat between refrigerant and coolant.

BACKGROUND ART

In general, as shown in FIG. 1, an air conditioner system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and evaporating the refrigerant to cool the air discharged to the interior of the vehicle due to heat absorption by evaporative latent heat, and that the compressor 1, the condenser 2, the expansion valve 3 and the evaporator 4 are connected with each other via refrigeration pipes. The air conditioner system cools the interior of the vehicle through the following refrigerant circulation process.

When a cooling switch (not shown) of the air conditioner system is turned on, first, the compressor 1 inhales and compresses gas-phase refrigerant of low-temperature and low-pressure while driving by driving power of an engine or a motor, and then sends the refrigerant in the gaseous phase of high-temperature and high-pressure to the condenser 2. Then, the condenser 2 condenses the gas-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the gas-phase refrigerant is inhaled into the compressor 1, and then, recirculates the refrigeration cycle as described above.

The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Moreover, the interior of the vehicle is heated by a heater core (not shown) which is mounted inside the air-conditioning case and through which coolant of the engine circulates or by an electric heater (not shown) mounted inside the air-conditioning case.

In the meantime, the condenser 2 is mounted at the front side of the vehicle to radiate heat while exchanging heat with air.

Recently, a heat pump system which carries out heating and cooling only using a refrigeration cycle has been developed. As shown in FIG. 2, such a heat pump system includes: a cold air passageway 11 and a warm air passageway 12 which are respectively formed at the left and the right inside one air-conditioning case 10; an evaporator 4 mounted on the cold air passageway 11 for cooling; and an air-cooled condenser 2 mounted on the warm air passageway 12 for heating.

In this instance, an air outflow port 15 is formed at an outlet of the air-conditioning case 10 for supplying air to the interior of the vehicle, and an air discharge port 16 is also formed at the exist of the air-conditioning case 10 for discharging air to the exterior of the vehicle.

Furthermore, blowers 20 are respectively mounted at inlets of the cold air passageway 11 and the warm air passageway 12.

Therefore, in a cooling mode, cold air cooled while passing through the evaporator 4 of the cold air passageway 11 is discharged to the interior of the vehicle through the air outflow port 15 to cool the interior of the vehicle, and in this instance, warm air heated while passing through the air-cooled condenser 2 of the warm air passageway 12 is discharged to the exterior of the vehicle through the air discharge port 16.

In a heating mode, warm air heated while passing through the air-cooled condenser 2 of the warm air passageway 12 is discharged to the interior of the vehicle through the air outflow port 15 to heat the interior of the vehicle, and in this instance, cold air cooled while passing through the evaporator 4 of the cold air passageway 11 is discharged to the exterior of the vehicle through the air discharge port 16.

However, in case of the prior art, in order to construct the air-cooled condenser 2 requiring lots of radiant values, the size or thickness of the air-cooled condenser 2 must be increased and the size of the blower 20 and the capacity of a motor of the blower 20 must be also increased to supply a lot of air volume to the air-cooled condenser 2. After all, the whole size of the system is increased.

Additionally, for radiant heat of the air-cooled condenser 2 increased in size, the system requires a large-capacity blower 20 and a large-capacity motor, and it causes an increase of power consumption and an increase of noise due to lots of air volume.

DISCLOSURE

Technical Problem

Accordingly, the present invention has been made in an effort to solve the above-mentioned problems occurring in the prior arts, and it is an object of the present invention to provide a heat pump system for a vehicle, which includes a compressor, an air-cooled condenser mounted on a warm air passageway, expansion means and an evaporator mounted on a cold air passageway of an air-conditioning case in order to carry out heating and cooling and further includes a water-cooled condenser mounted on a refrigerant circulation line between the compressor and the air-cooled condenser to exchange heat between refrigerant and coolant, thereby reducing the number and the size of blowers and the size of the entire system because the size of the air-cooled condenser inside the warm air passageway is reduced, and decreasing power consumption and noise by reducing capacity of a motor of the blower.

Technical Solution

To achieve the above objects, the present invention provides a heat pump system for a vehicle which includes a compressor, an air-cooled condenser, expansion means and an evaporator connected with one another through a refrigerant circulation line, comprising: an air-conditioning case having a cold air passageway on which the evaporator is mounted and a warm air passageway on which the air-cooled condenser is mounted; a blower which is mounted on the air-conditioning case to blow air to the cold air passageway and the warm air passageway; and a water-cooled condenser which is mounted on the refrigerant circulation line between the compressor and the air-cooled condenser to exchange heat between refrigerant discharged from the compressor and coolant so as to condense the refrigerant.

Advantageous Effects

As described above, the heat pump system for the vehicle according to the present invention includes a compressor, an air-cooled condenser mounted on a warm air passageway, expansion means and an evaporator mounted on a cold air passageway of an air-conditioning case in order to carry out heating and cooling and further includes a water-cooled condenser mounted on a refrigerant circulation line between the compressor and the air-cooled condenser to exchange heat between refrigerant and coolant, thereby reducing the number and the size of blowers and the size of the entire system because the size of the air-cooled condenser inside the warm air passageway is reduced, and decreasing power consumption and noise by reducing capacity of a motor of the blower.

Moreover, the heat pump system for the vehicle according to the present invention further includes controlling means for controlling heat exchange between the refrigerant discharged from the compressor and the coolant according to the heating mode and the cooling mode to control whether the water-cooled condenser is used or not according to the heating mode and the cooling mode.

Furthermore, the heat pump system for the vehicle according to the present invention further includes a receiver drier which is pressure rising means for rising pressure of the refrigerant and which is mounted on the refrigerant circulation line of the outlet side of the air-cooled condenser, thereby enhancing heating performance through pressure rise of the refrigerant of the system.

MODE FOR INVENTION

Figure 1:
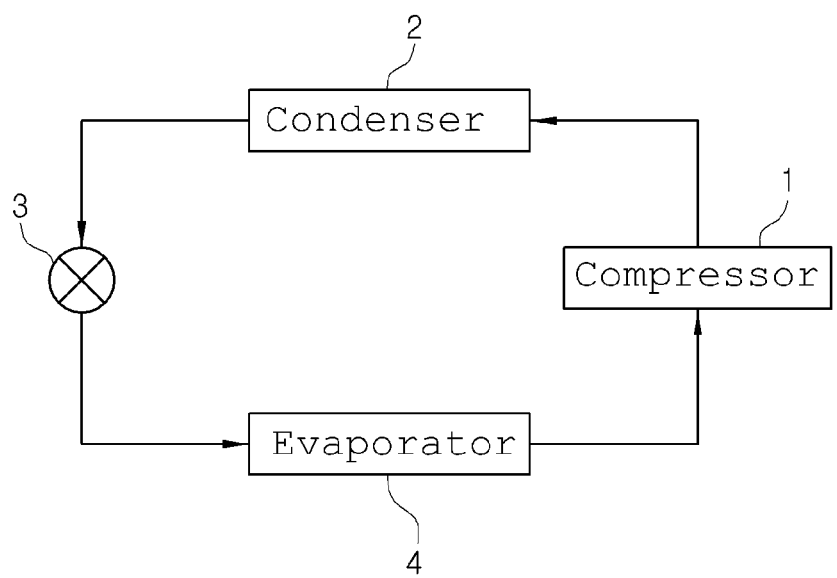
FIG. 1 is a configurative diagram showing a refrigeration cycle of a normal air conditioner system for a vehicle.
Figure 2:
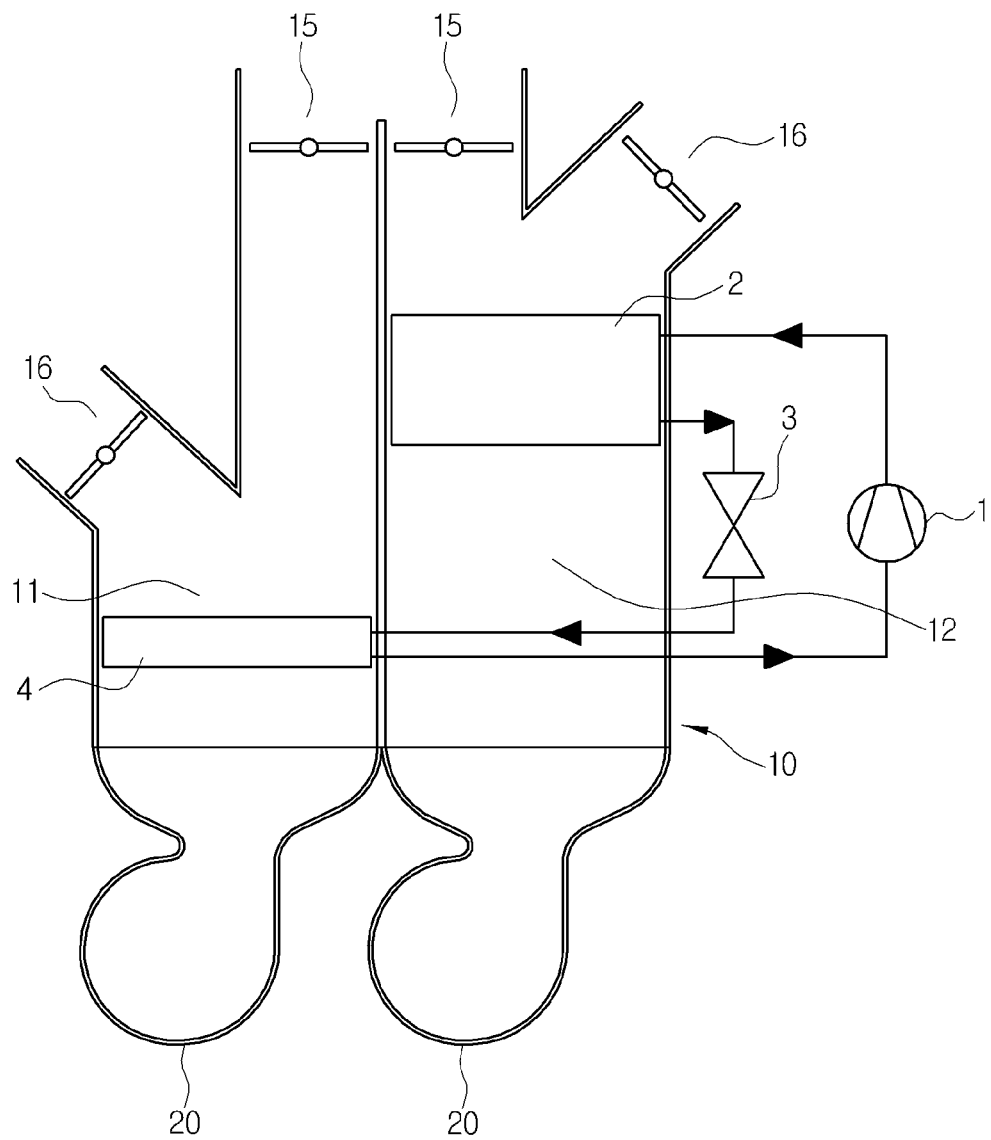
FIG. 2 is a view showing a heat pump system for a vehicle according to a prior art.

Reference will be now made in detail to the preferred embodiment of the present invention with reference to the attached drawings.

As shown in the drawings, a heat pump system for a vehicle according to the present invention includes a compressor 100, an air-cooled condenser 101, expansion means 103 and an evaporator 104 connected with one another through a refrigerant circulation line (R) so as to carry out cooling through the evaporator 104 and carry out heating through the air-cooled condenser 101, and further includes a water-cooled condenser 106.

First, the compressor 100 inhales and compresses gas-phase refrigerant of low-temperature and low-pressure discharged from the evaporator 104 while operating by receiving a driving force from a power supply, such as an engine or a motor, and then, discharges the refrigerant in a gas phase of high-temperature and high-pressure.

The air-cooled condenser 101 exchanges heat between the gas-phase refrigerant of high-temperature and high-pressure, which is discharged from the compressor 100 and flows inside the air-cooled condenser 101, and air passing through the air-cooled condenser 101, and in this instance, the refrigerant is condensed and the air is heated to be changed into warm air.

Such an air-cooled condenser 101 may have a structure that the refrigerant circulation line (R) is arranged in the form of a zigzag and a radiation fin (not shown) is mounted or a structure that a plurality of tubes (not shown) are connected between a pair of header tanks and a radiation fin is mounted between the tubes.

Therefore, the gas-phase refrigerant of high-temperature and high-pressure discharged from the compressor 100 exchanges heat with the air to be condensed while flowing along the zigzag-shaped refrigerant circulation line or the tubes, and in this instance, the air passing through the air-cooled condenser 101 is heated to be changed into warm air.

Moreover, the expansion means 103 rapidly expands liquid-phase refrigerant, which flows after being discharged from the air-cooled condenser 101, by throttling effect and sends the expanded refrigerant in a saturated state of low-temperature and low-pressure to the evaporator 104.

The expansion means 103 may be an expansion valve or an orifice structure.

The evaporator 104 evaporates the liquid-phase refrigerant of low-pressure, which flows after being discharged from the expansion means 103, by exchanging heat between the liquid-phase refrigerant and the inside air of the air-conditioning case 110 so as to cool the air due to a heat absorption by an evaporative latent heat of the refrigerant.

Continuously, the gas-phase refrigerant of low-temperature and low-pressure evaporated and discharged from the evaporator 104 is inhaled to the compressor 100 again, and then, recirculates the above-mentioned cycle.

Furthermore, in the above-mentioned refrigerant circulation process, the air blown by the blower 130 is induced into the air-conditioning case 110, is cooled by the evaporative latent heat of the liquid-phase refrigerant circulating inside the evaporator 104, and then, is discharged to the interior of the vehicle in a cooled state, so that the interior of the vehicle is heated.

The air blown by the blower 130 is induced into the air-conditioning case 110, is heated by heat radiation of the gas-phase refrigerant of high-temperature and high-pressure circulating inside the air-cooled condenser 101 while passing through the air-cooled condenser 101, and then, is discharged to the interior of the vehicle in a heated state, so that the interior of the vehicle is cooled.

Additionally, the air-conditioning case 110 includes a cold air passageway 111 and a warm air passageway 112 partitioned by a partition wall 113, which partitions the inside of the air-conditioning case 110, between an inlet and an outlet of the air-conditioning case 110.

In this instance, the air-conditioning case 110 is divided into a first case part which is formed at one side from the partition wall 113 and has the cold air passageway 111 for discharging cold air and a second case part which is formed at the other side from the partition wall 113 and has the warm air passageway 112 for discharging warm air, and the first case part and the second case part are formed integrally.

Figure 3:
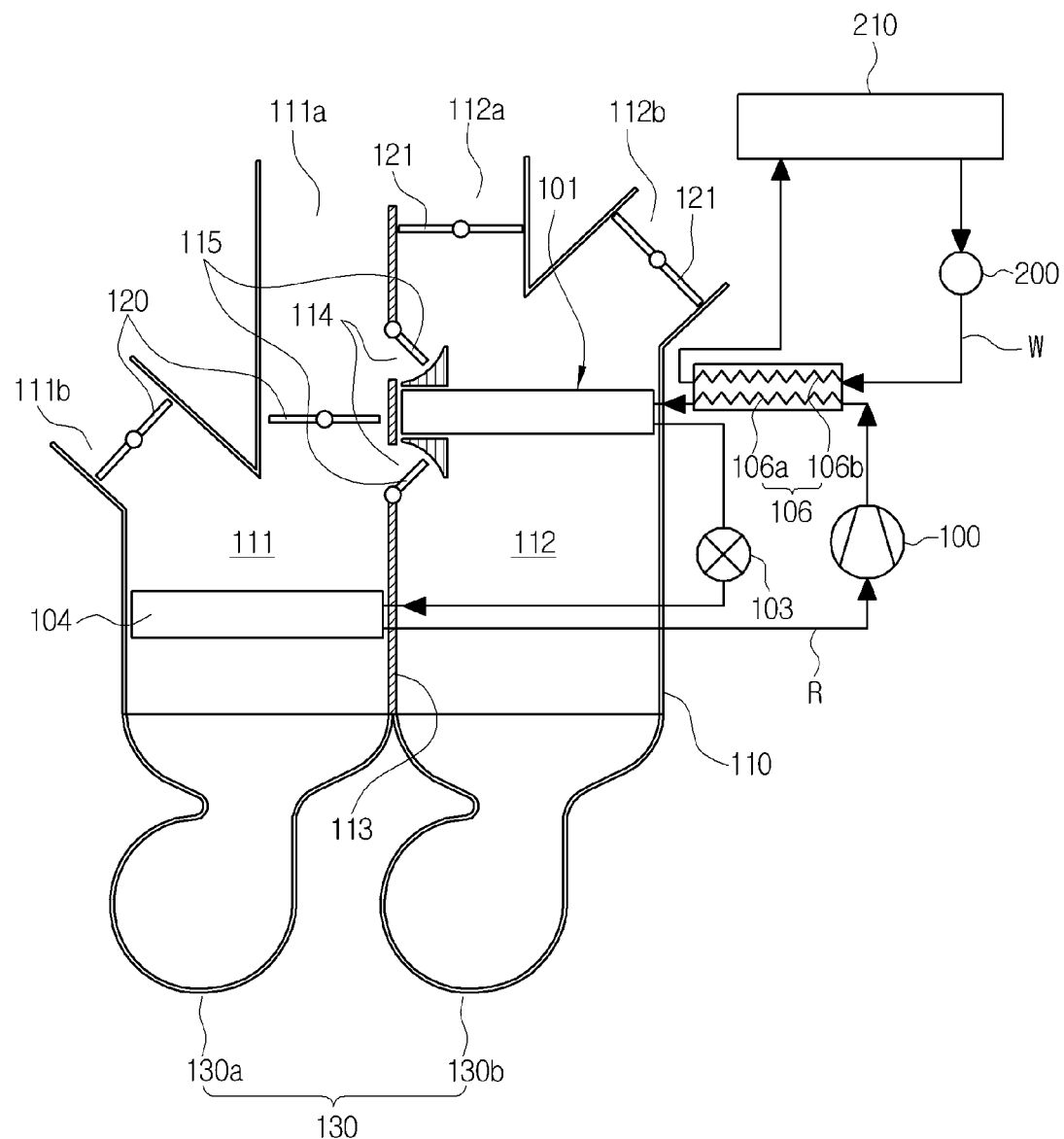
FIG. 3 is a view showing a heat pump system for a vehicle according to the present invention.

As shown in FIG. 3, because the partition wall 113 partitions the inside passageway of the air-conditioning case 110 into right and left, the cold air passageway 111 and the warm air passageway 112 are formed at the right and the left of the inside of the air-conditioning case 110. Of course, not shown in the drawings, but the inside of the air-conditioning case 110 may be partitioned into an upper part and a lower part so that the cold air passageway 111 and the warm air passageway 112 are formed at the upper part and the lower part of the inside of the air-conditioning case 110.

Moreover, the evaporator 104 is mounted in the cold air passageway 11 and the air-cooled condenser 101 is mounted in the warm air passageway 112, and in this instance, the evaporator 104 and the air-cooled condenser 101 are spaced apart from each other at a predetermined interval in an air flow direction.

Furthermore, bypass passageways 114 are formed in the partition wall 113 to communicate the warm air passageway 112 and the cold air passageway 111 with each other, and bypass doors 115 are respectively mounted on the bypass passageways 114 to open and close the bypass passageways 114.

In this instance, according to the locations of the evaporator 104 and the air-cooled condenser 101 and the locations of the bypass passageways 114, warm air flowing inside the warm air passageway 112 may be bypassed toward the cold air passageway 111 or cold air flowing inside the cold air passageway 111 may be bypassed toward the warm air passageway 112.

In the drawings, as an example, the bypass passageways 114 are respectively formed in the partition walls 113 of the upstream side and the downstream side of the air-cooled condenser 101. In this instance, when the bypass doors 115 respectively mounted on the bypass passageways 114 are regulated, the cold air of the cold air passageway 111 is bypassed toward the warm air passageway 112 or the warm air of the warm air passageway 112 is bypassed toward the cold air passageway 111.

In other words, in a state where the bypass door 115 closes the bypass passageway 114, in a cooling mode, the cold air cooled by the evaporator 1004 while flowing inside the cold air passageway 111 is supplied to the interior of the vehicle to carry out cooling, and in case of a heating mode, the warm air heated by the air-cooled condenser 101 while flowing inside the warm air passageway 112 is supplied to the interior of the vehicle to carry out heating.

In this instance, in the cooling mode, if only the bypass passageway 114 formed at the downstream side of the air flow direction of the air-cooled condenser 101 is opened, some of the warm air flowing inside the warm air passageway 112 flows toward the cold air passageway 111 and is mixed with the cold air so that it is possible to control temperature and air volume is increased.

In the heating mode, if only the bypass passageway 114 formed at the upstream side of the air flow direction of the air-cooled condenser 101 is opened, some of the cold air flowing inside the cold air passageway 111 flows toward the warm air passageway 112 and is mixed with the warm air so that it is possible to control temperature and air volume is increased.

In the meantime, in the cooling mode, when the bypass door 115 opens the bypass passageway 114, some of the cold air cooled by the evaporator 104 while flowing inside the cold air passageway 111 is bypassed toward the warm air passageway 112 through the bypass passageway 114 and is supplied toward the air-cooled condenser 101, so that the air-cooled condenser 101 radiates heat smoothly so as to lower temperature of the refrigerant and enhance cooling performance.

Additionally, the evaporator 104 is mounted above the bypass passageway 114 in the air flow direction inside the cold air passageway 111.

In addition, the blower 130 for blowing air to the cold air passageway 111 and the warm air passageway 112 is mounted at the inlet of the air-conditioning case 110.

Figure 6:
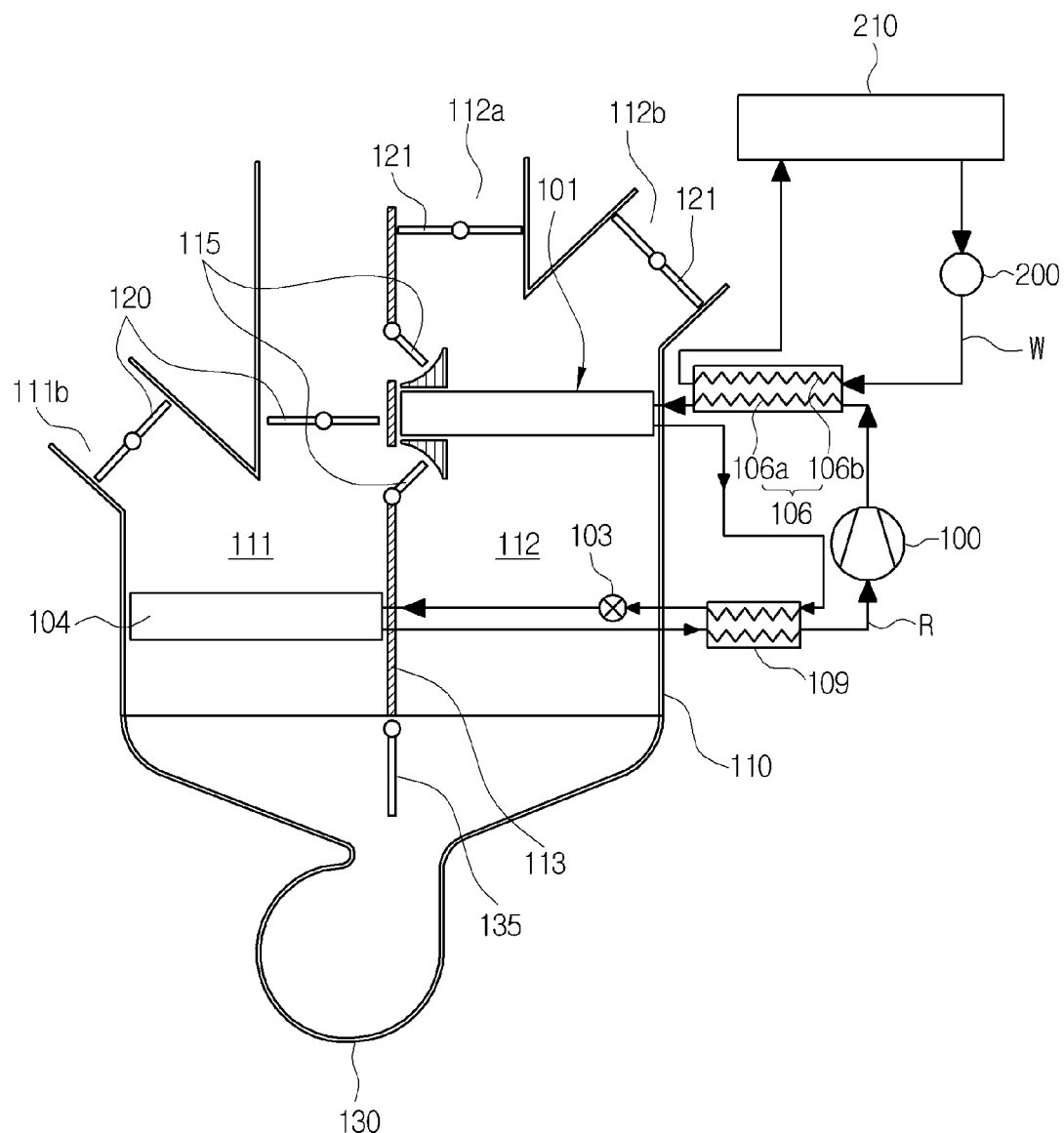
FIG. 6 is a view showing a state where a single blower is mounted in the heat pump system for the vehicle according to the present invention.

Two blowers 130 may be mounted as shown in FIG. 3, or a single blower 130 may be mounted as shown in FIG. 6.

First, the case that the two blowers 130 are mounted will be described. The blowers 130 include: a first blower 130a which is mounted at an inlet side of the cold air passageway 111 of the air-conditioning case 110 to send air toward the cold air passageway 111; and a second blower 130b which is mounted at an inlet side of the warm air passageway 112 of the air-conditioning case 110 to send air toward the warm air passageway 112.

Each of the first blower 130a and the second blower 130b has a motor (not shown) and a fan (not shown), and may have an intake duct (not shown) for inducing inside air and outside air.

Of course, one intake duct may be mounted to be commonly used for the first and second blowers 130a and 130b.

Therefore, air is blown into the cold air passageway 111 when the first blower 130a is operated, and air is blown into the warm air passageway 112 when the second blower 130b is operated. In this instance, because the first blower 130a and the second blower 130b can be operated individually, it is possible to individually control the air volume discharged to the interior of the vehicle through the cold air passageway 111 and the warm air passageway 112.

Moreover, as shown in FIG. 6, in case of the single blower 130, the blower 130 is mounted at the inlet sides of the cold air passageway 111 and the warm air passageway 112 in order to send air to the cold air passageway 111 and the warm air passageway 112.

That is, an outlet of the single blower 130 is connected to the inlet sides of the cold air passageway 111 and the warm air passageway 112 to be communicated with the cold air passageway 111 and the warm air passageway 112.

In this instance, an air volume control door 135 is mounted at the outlet side of the blower 130 in order to control the air volume blown to the cold air passageway 111 and the warm air passageway 112. Therefore, even though the single blower 130 is used, the air volume control door 135 can control the air volume blown to the cold air passageway 111 and the warm air passageway 112.

Furthermore, an outlet of the cold air passageway 111 of the air-conditioning case 110 includes: a cold air outflow port 111a for discharging the cold air passing the evaporator 104 to the interior of the vehicle; and a cold air discharge port 111b for discharging the cold air passing the evaporator 104 to the exterior of the vehicle.

An outlet of the warm air passageway 112 of the air-conditioning case 110 includes: a warm air outflow port 112a for discharging the warm air passing the air-cooled condenser 101 to the interior of the vehicle; and a warm air discharge port 112b for discharging the warm air passing the air-cooled condenser 101 to the exterior of the vehicle.

In this instance, the cold air outflow port 111a and the warm air outflow port 112a of the air-conditioning case 110 are adjacent to each other. That is, if the cold air outflow port 111a and the warm air outflow port 112a are adjacent to each other, cold air and warm air can be supplied to the interior of the vehicle in a mixed state so that the interior of the vehicle can be controlled to proper temperature.

Additionally, cold air mode doors 120 are respectively disposed at the cold air outflow port 111a and the cold air discharge port 111b to adjust the degree of opening, and warm air mode doors 121 are respectively disposed at the warm air outflow port 112a and the warm air discharge port 112b to adjust the degree of opening.

Figure 7:
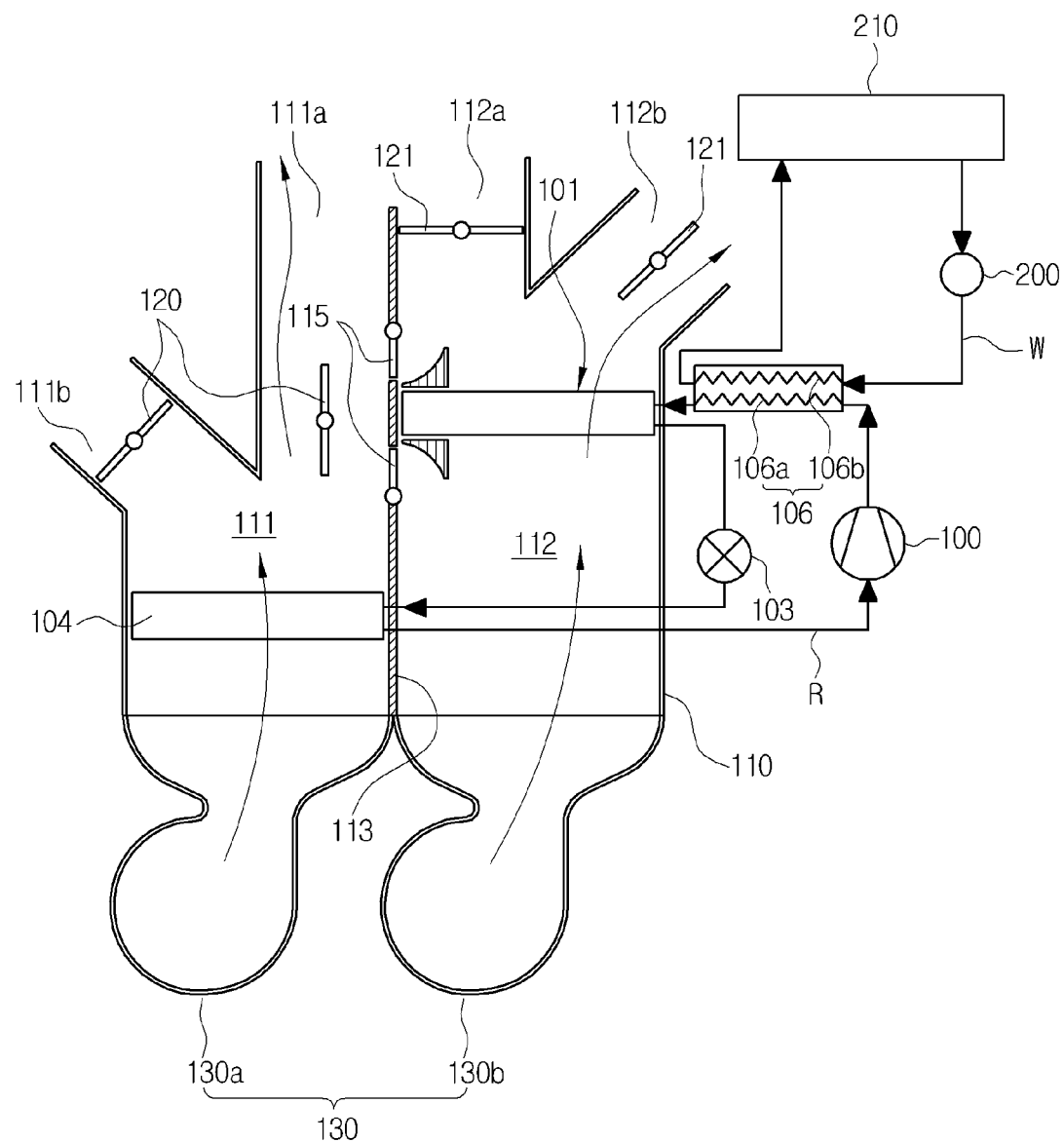
FIG. 7 is a view showing a cooling mode of the heat pump system for the vehicle according to the present invention.

Therefore, in the cooling mode, as shown in FIG. 7, when the cold air outflow port 111a and the warm air discharge port 112b are opened, the air flowing inside the cold air passageway 111 is cooled after passing through the evaporator 104, and then, is discharged to the interior of the vehicle through the cold air outflow port 111a to carry out cooling. In this instance, the air flowing inside the warm air passageway 112 is heated while passing through the air-cooled condenser 101, and then, is discharged to the exterior of the vehicle through the warm air discharge port 112b.

Figure 8:
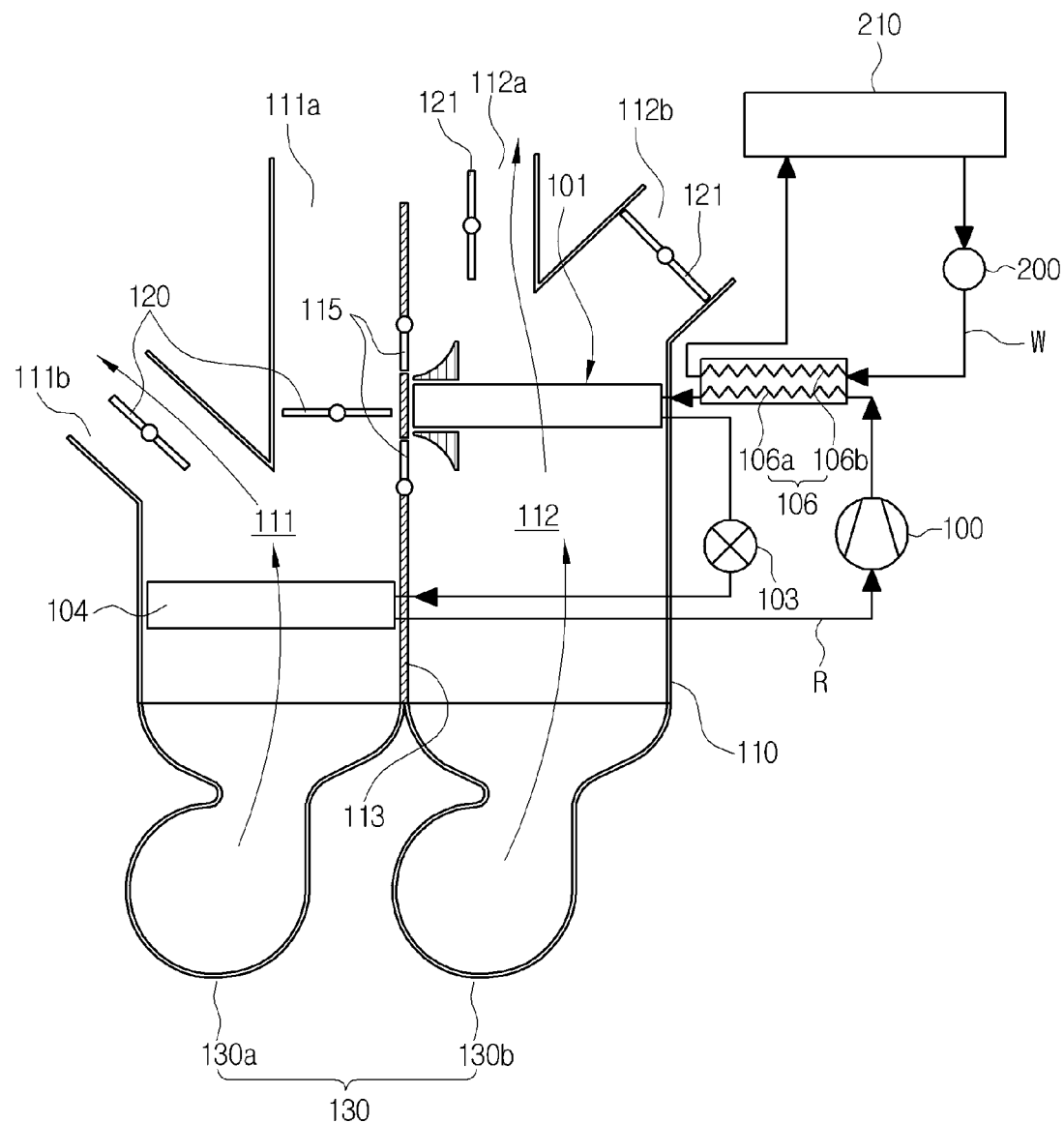
FIG. 8 is a view showing a heating mode of the heat pump system for the vehicle according to the present invention.
Figure 9:
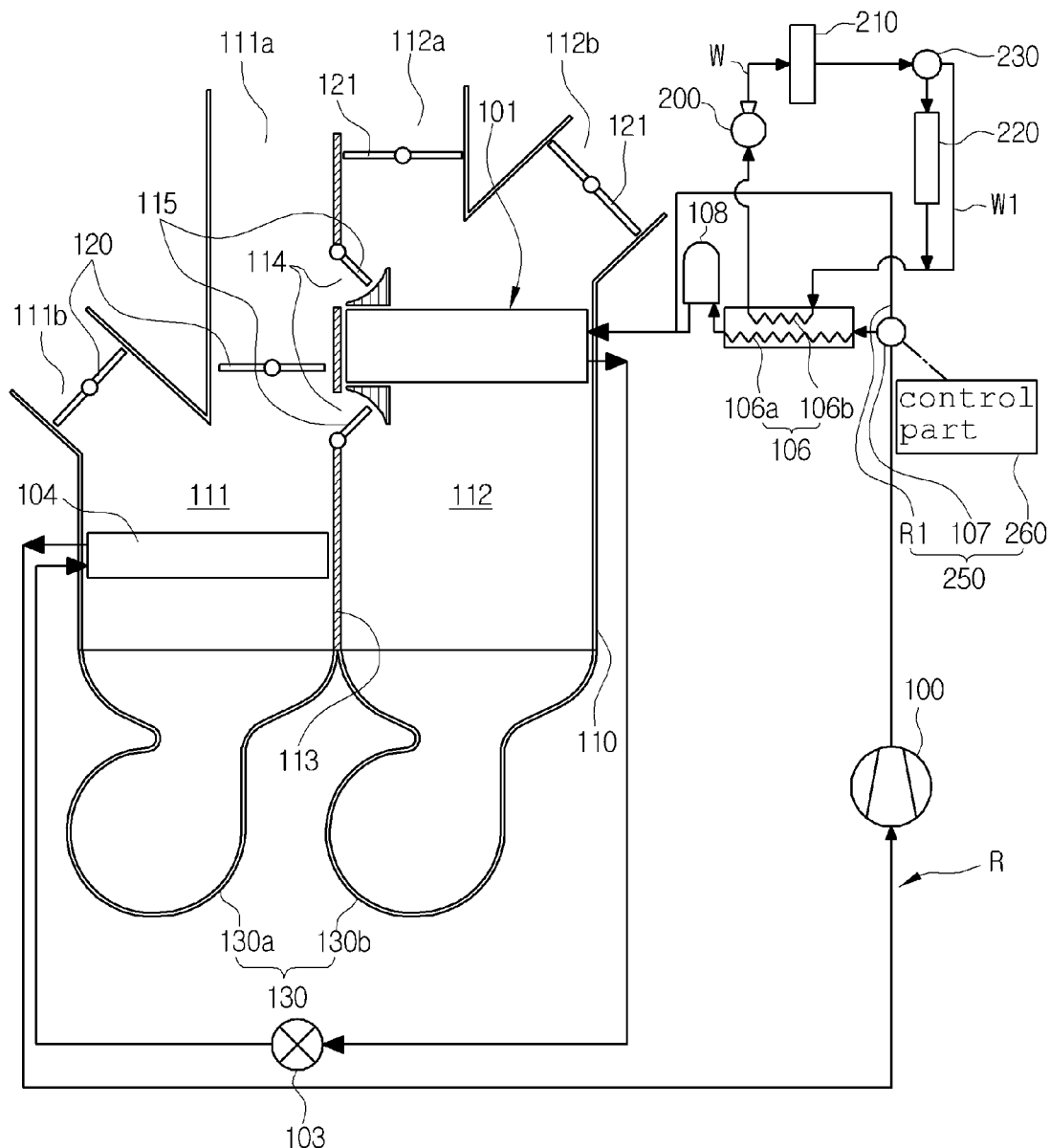
FIG. 9 is a view showing controlling means of the heat pump system for the vehicle according to a first preferred embodiment of the present invention.

In the heating mode, as shown in FIG. 8, when the warm air outflow port 112a and the cold air discharge port 111b are opened, the air flowing inside the warm air passageway 112 is heated after passing through the air-cooled condenser 101, and then, is discharged to the interior of the vehicle through the warm air outflow port 112a to carry out heating. In this instance, the air flowing inside the cold air passageway 111 is cooled while passing through the evaporator 104, and then, is discharged to the exterior of the vehicle through the cold air discharge port 111b.

Meanwhile, the cold air mode doors 120 for adjusting the degree of opening of the cold air outflow port 111a are arranged collinearly with the air-cooled condenser 101.

Moreover, the water-cooled condenser 106 for condensing the refrigerant, which flows after being discharged from the compressor 100, by exchanging heat between the refrigerant and coolant is connected and mounted on the refrigerant circulation line (R) between the compressor 100 and the air-cooled condenser 101.

The water-cooled condenser 106 condenses the gas-phase refrigerant of high-temperature and high-pressure, which flows after being discharged from the compressor 100, into liquid-phase refrigerant by exchanging heat between the refrigerant and the coolant, and then, discharges the refrigerant out.

Such a water-cooled condenser 106 includes: a refrigerant channel 106a through which the refrigerant discharged from the compressor 100 flows; and a coolant channel 106b through which the coolant circulating through a water-cooled radiator 210 mounted inside an engine room of the vehicle or circulating through an electronic unit of the vehicle, and the refrigerant channel 106a and the coolant channel 106b are configured to be able to exchange heat with each other so as to exchange heat between the refrigerant and the coolant.

The water-cooled condenser 106 may be a plate-type heat exchanger that the refrigerant channel 106a and the coolant channel 106b are layered by turns.

Figure 4:
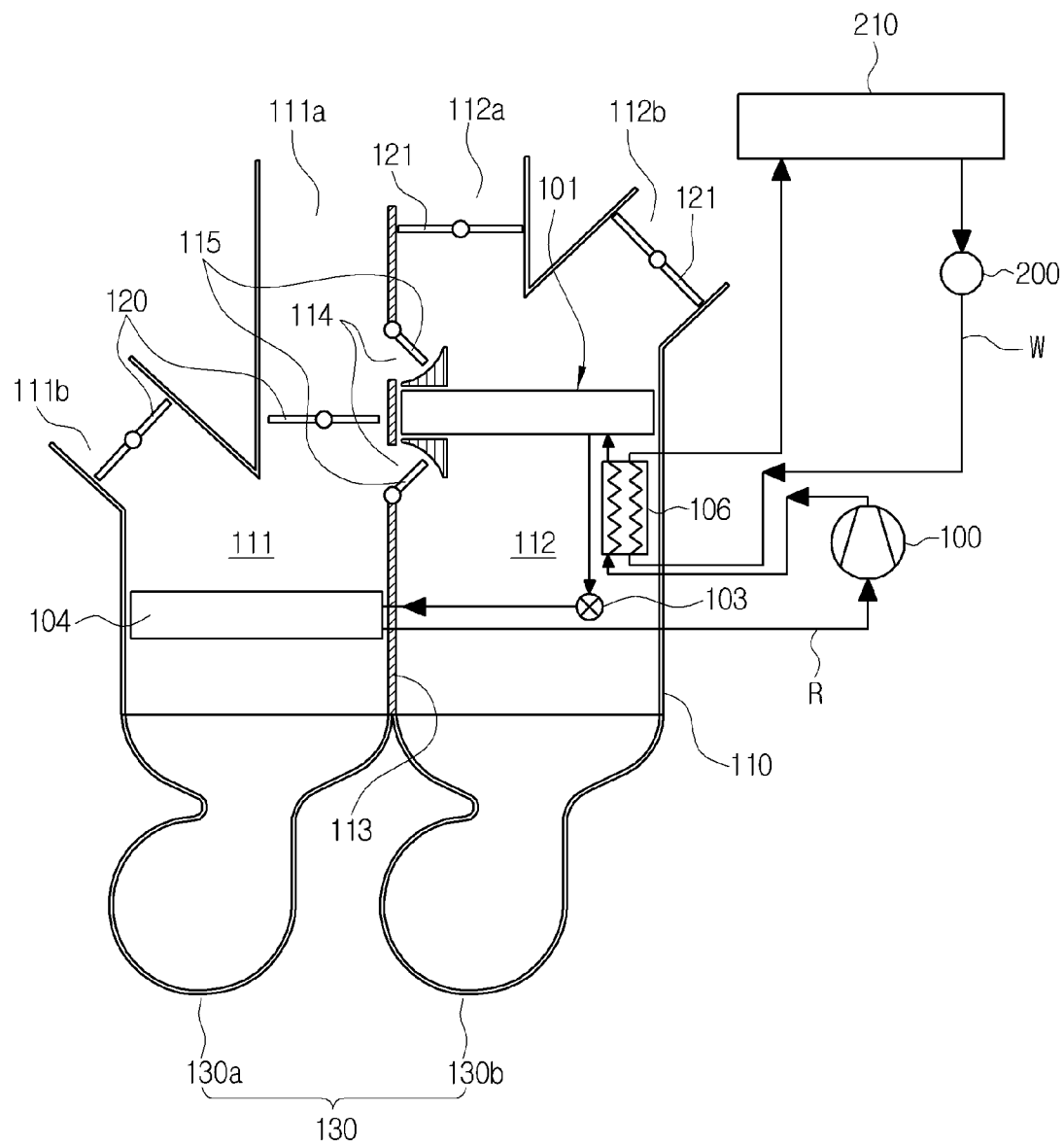
FIG. 4 is a view showing a case that a water-cooled condenser is mounted inside an air-conditioning case of the heat pump system of FIG. 3.

Furthermore, preferably, the water-cooled condenser 106 is mounted outside the air-conditioning case 110, but as shown in FIG. 4, may be mounted outside the air-conditioning case 110. In this instance, the water-cooled condenser 106 is mounted at the upstream side of the air-cooled condenser 101 in the air flow direction inside the warm air passageway 112. That is, because hot air flows through the downstream side of the air flow direction of the air-cooled condenser 101, the water-cooled condenser 106 is mounted at the upstream side of the air-cooled condenser 101 not to be affected by the hot air.

The water-cooled radiator 210 is connected with the coolant channel 106b of the water-cooled condenser 106 through a coolant circulation line (W), and a water pump 200 is mounted on the coolant circulation line (W) in order to circulate the coolant.

As described above, the water pump 200 for circulating the coolant and the water-cooled radiator 210 for cooling the coolant by exchanging heat with air are mounted on the coolant circulation line (W).

The water-cooled radiator 210 is mainly used in order to cool electronic units of the vehicle.

In the meantime, FIGS. 3 to 8 illustrate the coolant circulation line (W) in brief. In more detail, as shown in FIGS. 9 to 15, a coolant bypass line (W1) for bypassing the coolant, which circulates through the water pump 200, the water-cooled radiator 210, an electronic unit 220 of the vehicle and the coolant circulation line (W), is further mounted on the coolant circulation line (W).

Accordingly, the coolant circulating through the water-cooled radiator 210 and the electronic unit 220 of the vehicle circulates to the water-cooled condenser 106.

The coolant bypass line (W1) is mounted to connect the coolant circulation line (W) of an inlet side of the electronic unit 220 with the coolant circulation line (W) of an outlet side of the electronic unit 220, and a coolant direction-changing valve 230 is mounted at a branching point between the coolant bypass line (W1) and the coolant circulation line (W).

The coolant direction-changing valve 230 circulates the coolant toward the electronic unit 220 if it is necessary to cool the electronic unit 220, but circulates the coolant toward the coolant bypass line (W1) if it is not necessary to cool the electronic unit 220.

Therefore, when the water pump 200 is operated, the coolant circulating through the coolant circulation line (W) exchanges heat with the refrigerant flowing through the refrigerant channel 106a of the water-cooled condenser 106 while flowing through the coolant channel 106b of the water-cooled condenser 106, and in this process, the refrigerant flowing through the water-cooled condenser 106 is cooled and condensed.

The refrigerant condensed in the water-cooled condenser 106 flows to the air-cooled condenser 101, and then, is cooled again while exchanging heat with the air flowing through the warm air passageway 112 of the air-conditioning case 110.

As described above, because the heat pump system for the vehicle according to the present invention includes not only the air-cooled condenser 101 but also the water-cooled condenser 106, the heat pump system can use lots of radiant heat sources so as to lower heat radiation performance of the air-cooled condenser 101, can reduce the whole size of the system by reducing the size of the air-cooled condenser 101 and reducing the air volume, the number and the size of the blowers 130.

Furthermore, the heat pump system for the vehicle according to the present invention can reduce capacity of the motor of the blower 130 and also reduce power consumption and noise of the motor because the air-cooled condenser 101 can be reduced in size and lowered in heat radiation performance due to the water-cooled condenser 106.

Figure 5:
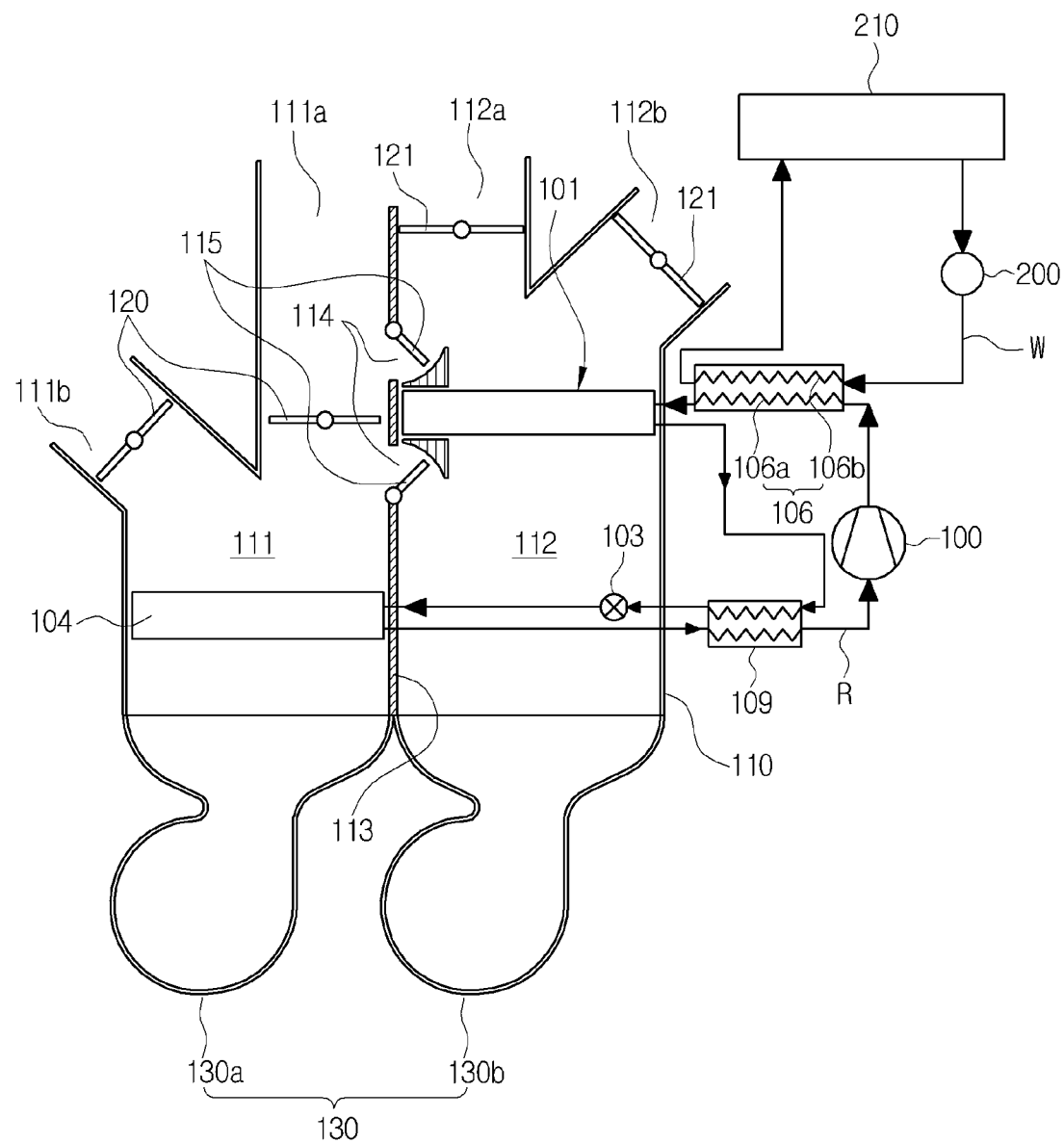
FIG. 5 is a view showing a case that an internal heat exchanger is added into the heat pump system of FIG. 3.

Additionally, as shown in FIGS. 5 and 6, an internal heat exchanger 109 which exchanges heat between the refrigerant discharged from the air-cooled condenser 101 and the refrigerant discharged from the evaporator 104 is mounted on the refrigerant circulation line (R).

The internal heat exchanger 109 is a heat exchanger for exchanging heat between refrigerants. The internal heat exchanger 109 is illustrated in the drawings in brief, but may be configured in a plate-type heat exchanger or in a dual tube type heat exchanger.

Therefore, while flowing through the internal heat exchanger 109, the refrigerant passing through the air-cooled condenser 101 exchanges heat with the refrigerant of low-temperature, which flows through the internal heat exchanger 109 after being discharged from the evaporator 104, so as to be supercooled, and then, is induced into the expansion valve 103. So, when temperature of the refrigerant lowers more, the heat pump system can be enhanced in air-conditioning performance due to an enthalpy rise of the evaporator 104.

Moreover, because temperature of the refrigerant induced into the compressor 100 through the internal heat exchanger 109 after being discharged from the evaporator 104 also lowers, temperature of the refrigerant discharged from the compressor 100 does not exceed the upper limit.

In the meantime, the internal heat exchanger 109 may be mounted outside the air-conditioning case 110 or may be mounted at the upstream side of the air-cooled condenser 101 in the air flow direction inside the warm air passageway 112.

Furthermore, as shown in FIGS. 9 to 14, controlling means 250 and 251 are mounted to control heat exchange between the refrigerant discharged from the compressor 100 and the coolant according to the cooling mode and the heating mode.

The controlling means 250 and 251 will be described with reference to two preferred embodiments.

First, as shown in FIGS. 9 to 12, the controlling means 250 according to the first preferred embodiment includes: a first bypass line (R1) which connects the refrigerant circulation line (R) of the inlet side of the water-cooled condenser 106 and the refrigerant circulation line (R) of the outlet side of the water-cooled condenser 106 with each other; a first direction-changing valve 107 which is mounted at a branching point between the first bypass line (R1) and the refrigerant circulation line (R) to change a flow direction of the refrigerant; and a control part 260 for controlling the first direction-changing valve 107 according to the cooling mode and the heating mode.

The first direction-changing valve 107 is mounted at the branching point between the refrigerant circulation line (R) of the inlet side of the water-cooled condenser 106 and the first bypass line (R1).

Figure 11:
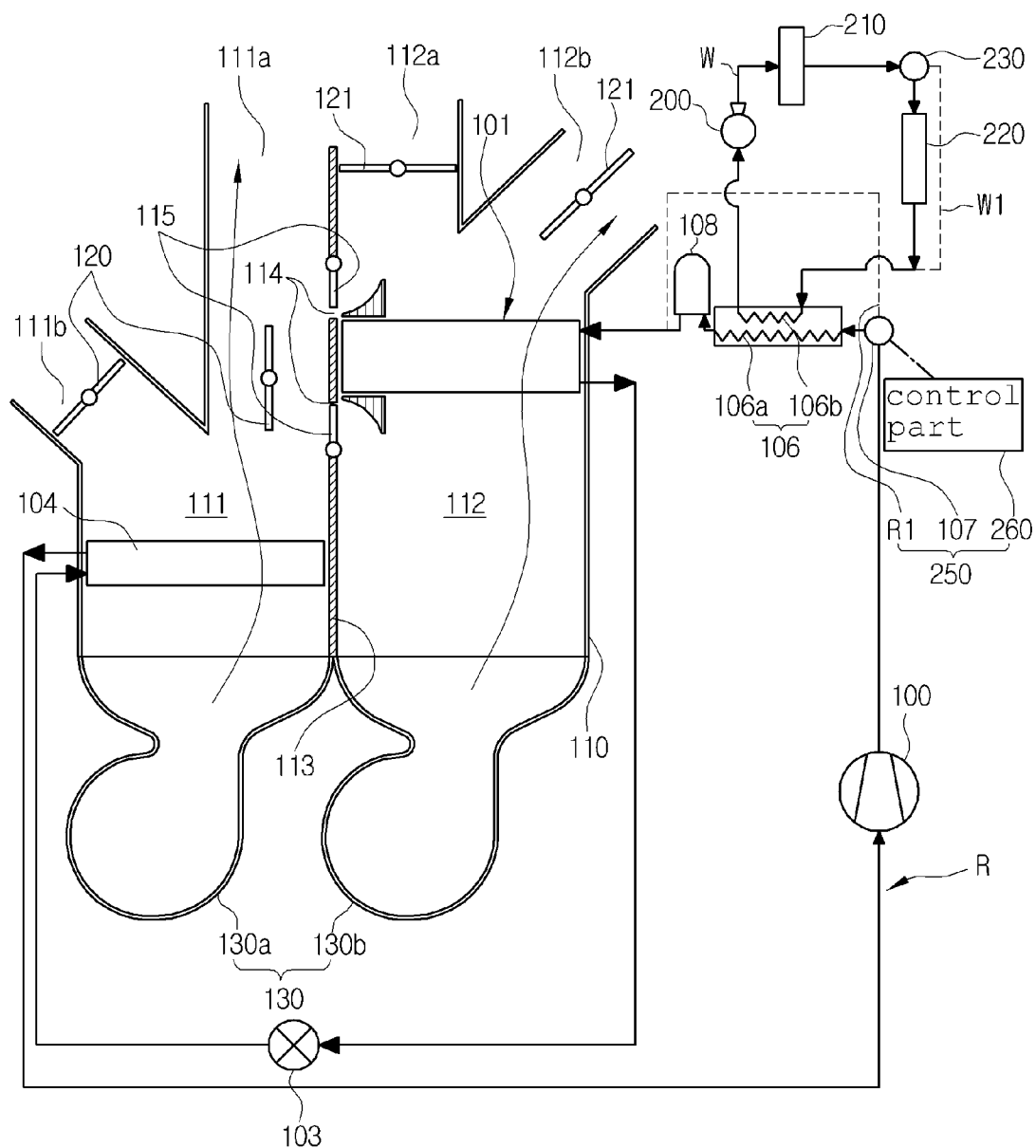
FIG. 11 is a view showing the cooling mode by the controlling means of FIG. 9.
Figure 12:
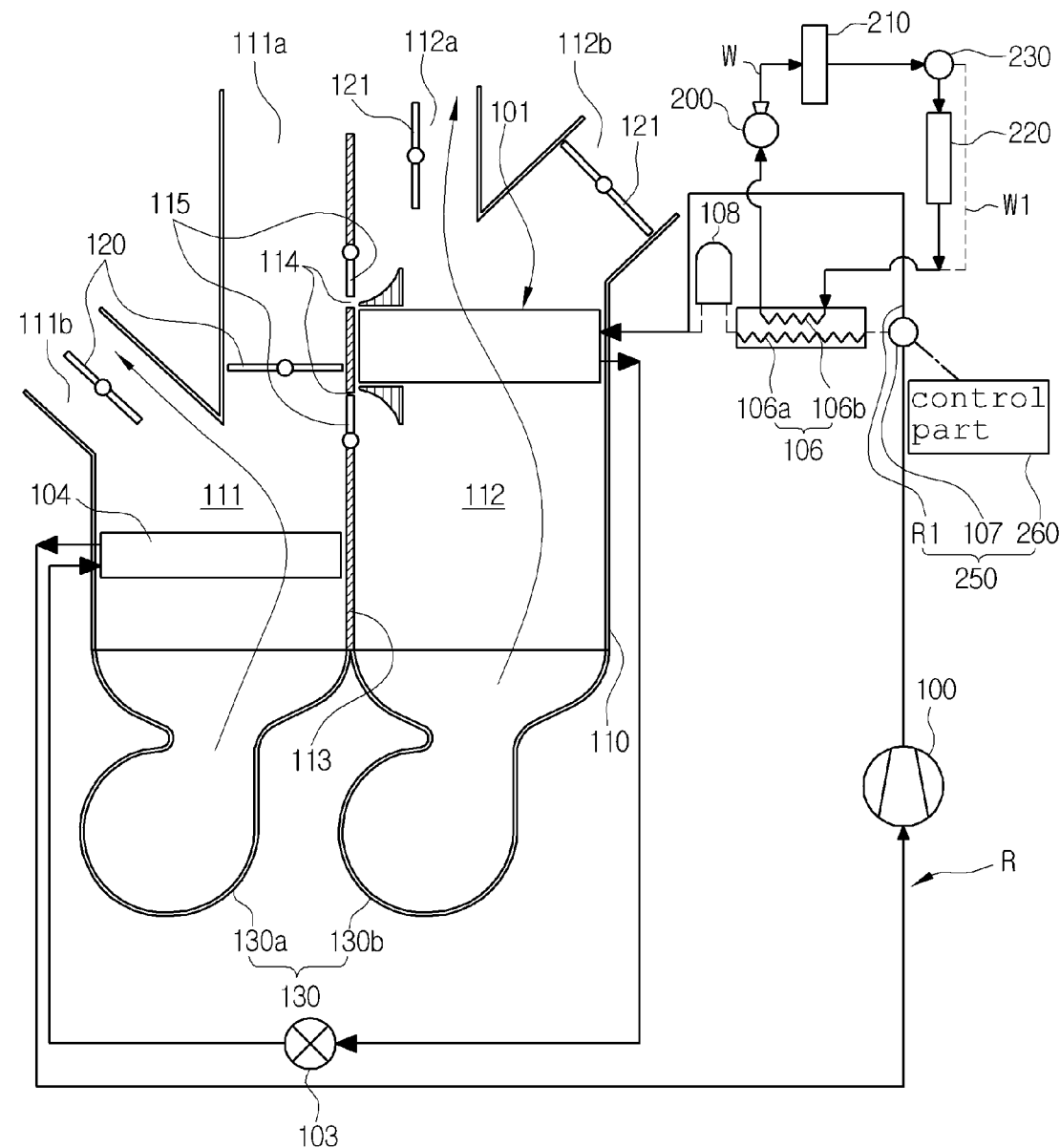
FIG. 12 is a view showing the heating mode by the controlling means of FIG. 9.

In the cooling mode, as shown in FIG. 11, the control part 260 controls the first direction-changing valve 107 so that the refrigerant discharged from the compressor 100 flows toward the water-cooled condenser 106, and in the heating mode, as shown in FIG. 12, controls the first direction-changing valve 107 so that the refrigerant discharged from the compressor 100 flows toward the first bypass line (R1) and bypasses the water-cooled condenser 106.

In other words, in the cooling mode, the heat pump system according to the present invention can reduce the temperature of the refrigerant further and enhance cooling performance because using all of the water-cooled condenser 106 and the air-cooled condenser 101 to use lots of radiant heat sources.

In this instance, the coolant circulating through the water-cooled radiator 210 of the coolant circulation line (W) and the electronic unit 220 circulates to the water-cooled condenser 106, and then, exchanges heat with the refrigerant.

In the heating mode, because the refrigerant circulates to the first bypass line (R1), the refrigerant does not flow to the water-cooled condenser 106, and the heat pump system realizes heating performance only using the heat source of the air-cooled condenser 101 so as to enhance heating performance.

If the refrigerant flows to the water-cooled condenser 106 in the heating mode, temperature of the refrigerant lowers due to radiation of heat by heat exchange between the refrigerant and the coolant, and it causes deterioration in heating performance.

Meanwhile, even in the heating mode, the coolant which circulates through the water-cooled radiator 210 of the coolant circulation line (W) and the electronic unit 220 circulates to the water-cooled condenser 106, but because the refrigerant does not flow to the water-cooled condenser 106, there is no heat exchange between the refrigerant and the coolant.

Figure 13:
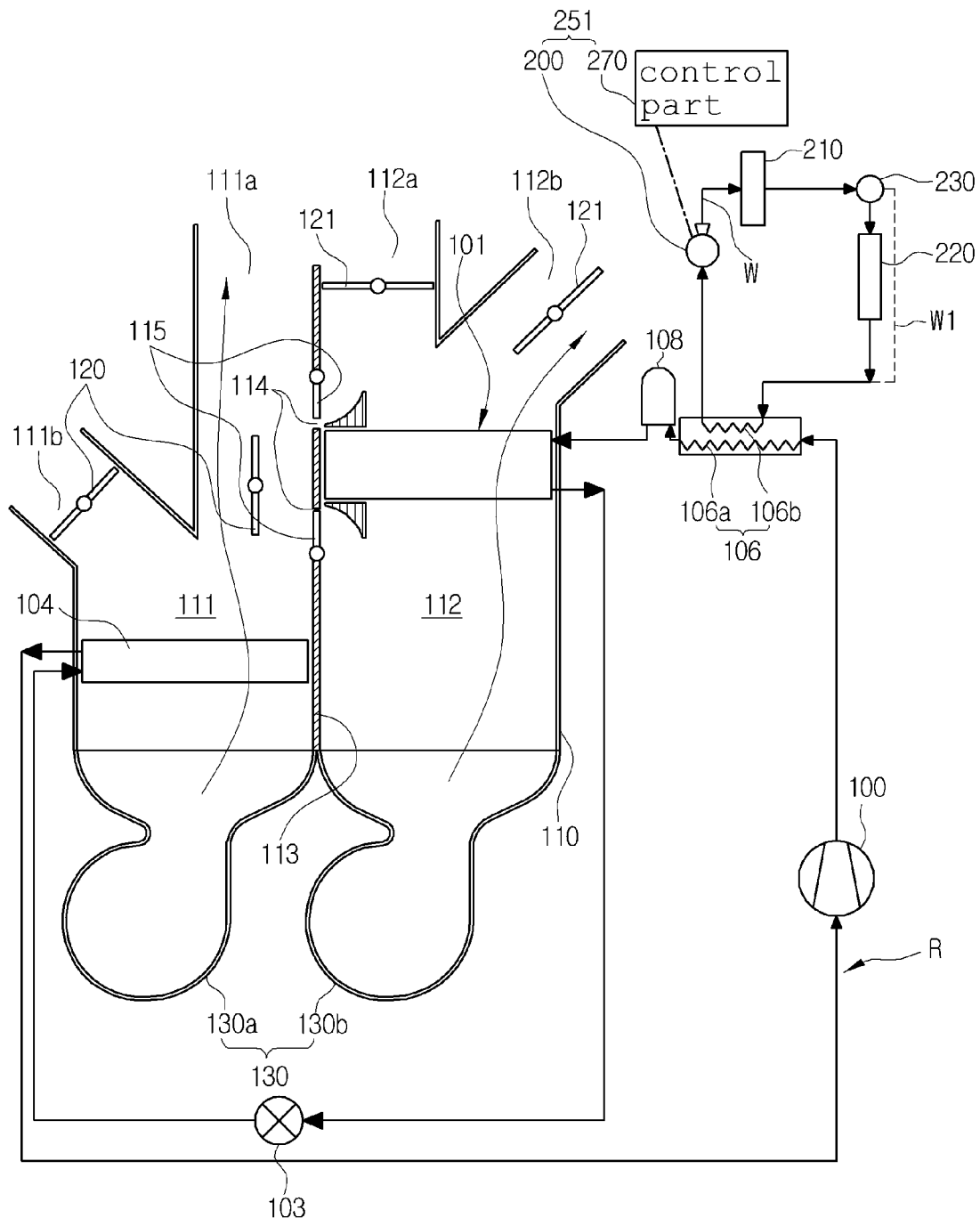
FIG. 13 is a view showing the cooling mode by a controlling means of the heat pump system for the vehicle according to a second preferred embodiment of the present invention.
Figure 14:
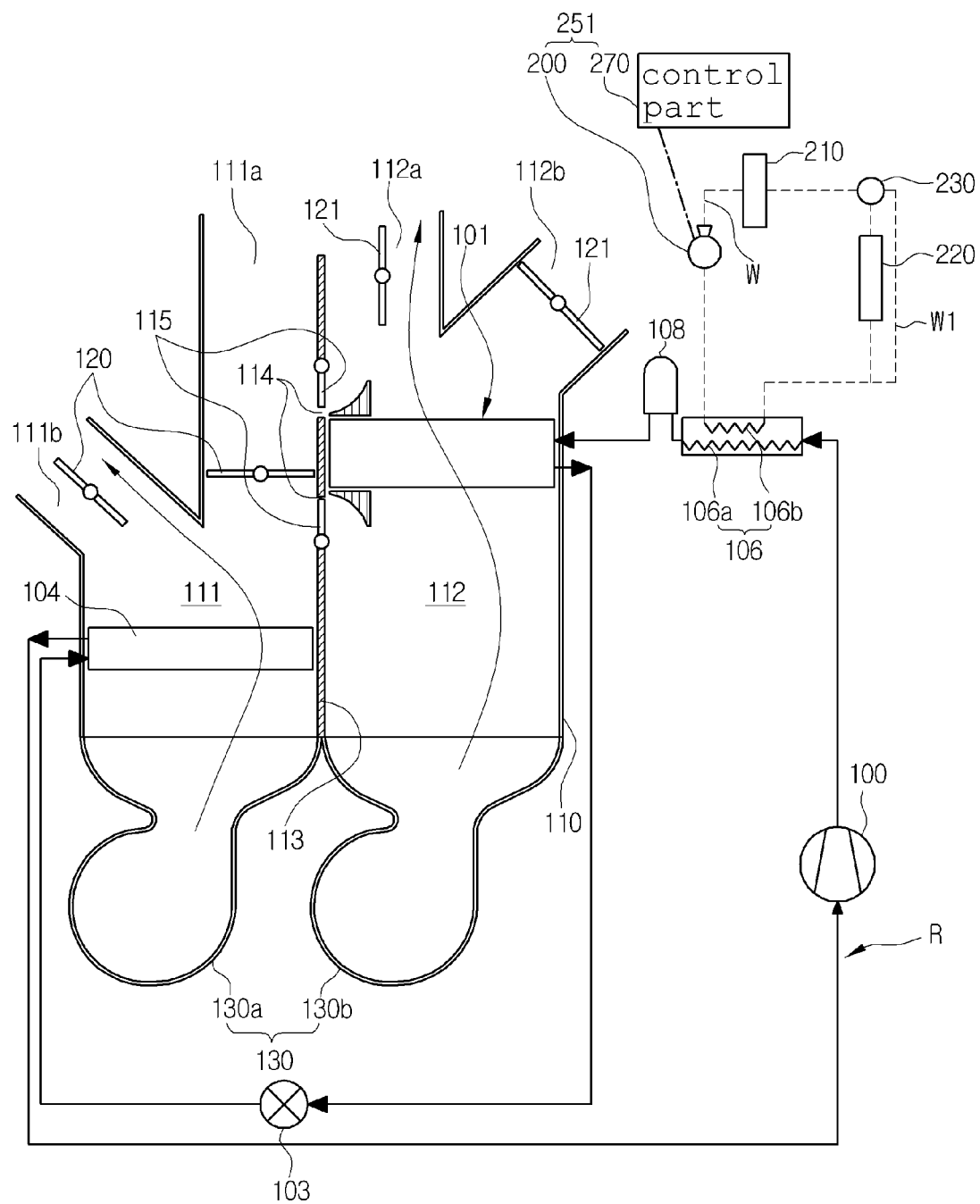
FIG. 14 is a view showing the heating mode by the controlling means of the heat pump system for the vehicle according to the second preferred embodiment of the present invention.

Next, as shown in FIGS. 13 and 14, the controlling means 251 according to the second preferred embodiment controls the flow of the coolant of the coolant circulation line (W) without the first bypass line (R1) and the first direction-changing valve (107) to control heat exchange between the refrigerant discharged from the compressor 100 and the coolant.

That is, the controlling means 250 according to the first preferred embodiment controls the flow of the refrigerant to control heat exchange between the refrigerant and the coolant, but the controlling means 251 according to the second preferred embodiment controls the flow of the coolant to control heat exchange between the refrigerant and the coolant.

The controlling means 251 according to the second preferred embodiment includes a control part 270 which controls the water pump 200 of the coolant circulation line (W) according to the cooling mode and the heating mode to control a flow rate of the coolant circulating to the water-cooled condenser 106.

The control part 270 controls to turn on the water pump 200 so that the coolant circulates toward the water-cooled condenser 106 in the cooling mode as shown in FIG. 13, and controls to turn off the water pump 200 so that the coolant does not circulate toward the water-cooled condenser 106 in the heating mode as shown in FIG. 14.

In other words, in the cooling mode and in the heating mode, the refrigerant discharged from the compressor 100 passes through all of the water-cooled condenser 106 and the air-cooled condenser 101, but the controlling means 251 according to the second preferred embodiment controls the flow of the coolant circulating to the water-cooled condenser 106 according to the cooling mode and the heating mode so as to control heat exchange between the coolant and the refrigerant flowing through the water-cooled condenser 106.

Therefore, in the cooling mode, as shown in FIG. 13, because the water pump 200 is turned on to circulate the coolant to the water-cooled condenser 106, the refrigerant discharged from the compressor 100 exchanges heat with the coolant in the water-cooled condenser 106 to be cooled or to radiate heat, and then, exchanges heat with the air, which flows through the warm air passageway 112 of the air-conditioning case 110, in the air-cooled condenser 101 to be supercooled or to radiate heat. Accordingly, the heat pump system for the vehicle can enhance cooling performance because using the water-cooled condenser 106 and the air-cooled condenser 101 to use lots of radiant heat sources.

In the heating mode, as shown in FIG. 14, because the water pump 200 is turned off and the coolant does not circulate to the water-cooled condenser 106, the refrigerant discharged from the compressor 100 passes through the water-cooled condenser 1006, and then, exchanges heat with the air, which flows through the warm air passageway 112 of the air-conditioning case 110, in the air-cooled condenser 101 to be cooled or to radiate heat. Accordingly, the heat pump system for the vehicle can enhance heating performance because only using the heat source of the air-cooled condenser 101 to provide heating performance.

Figure 15:
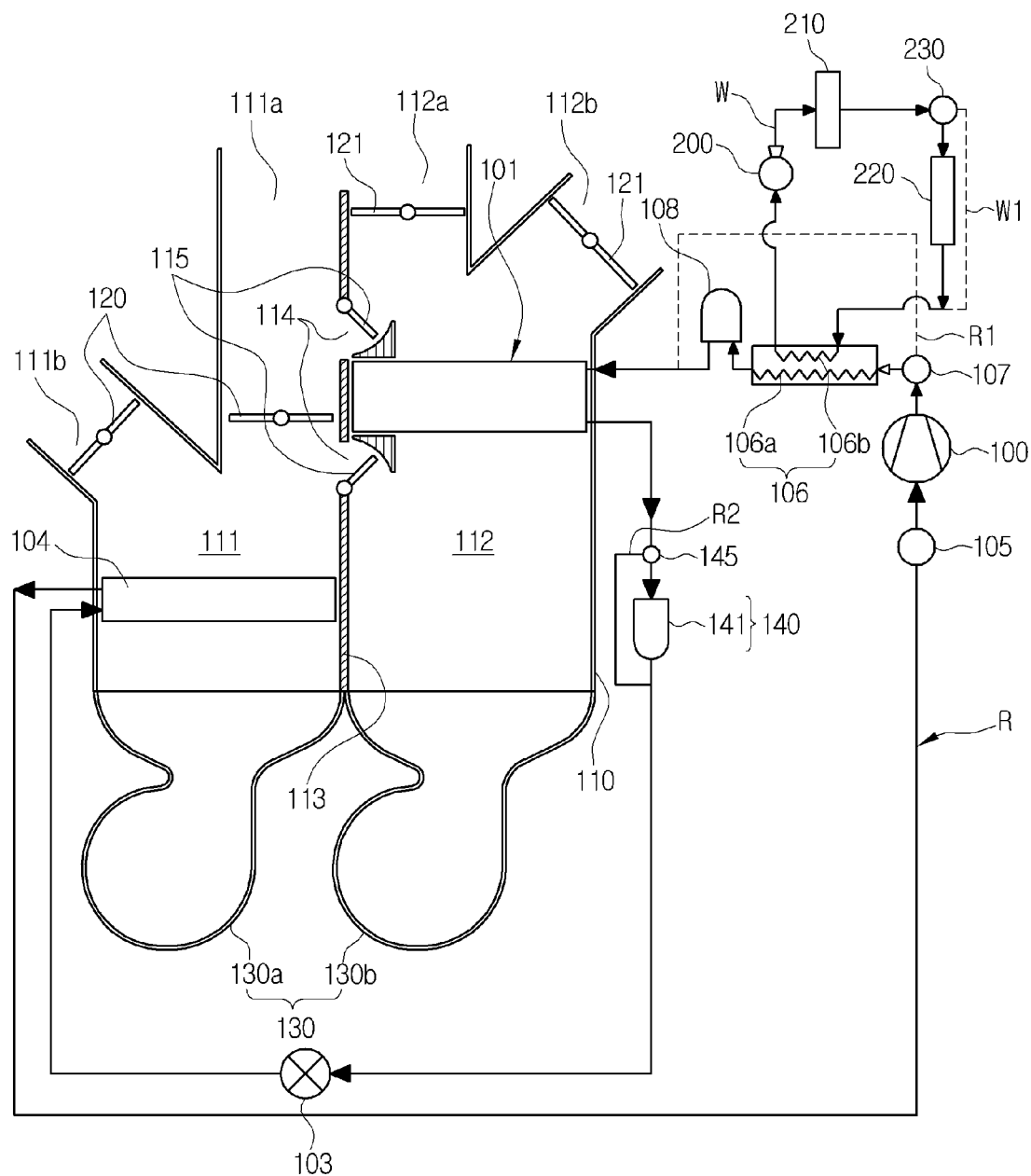
FIG. 15 is a view showing a state where pressure rising means is mounted in the heat pump system for the vehicle according to the present invention.
Figure 16:
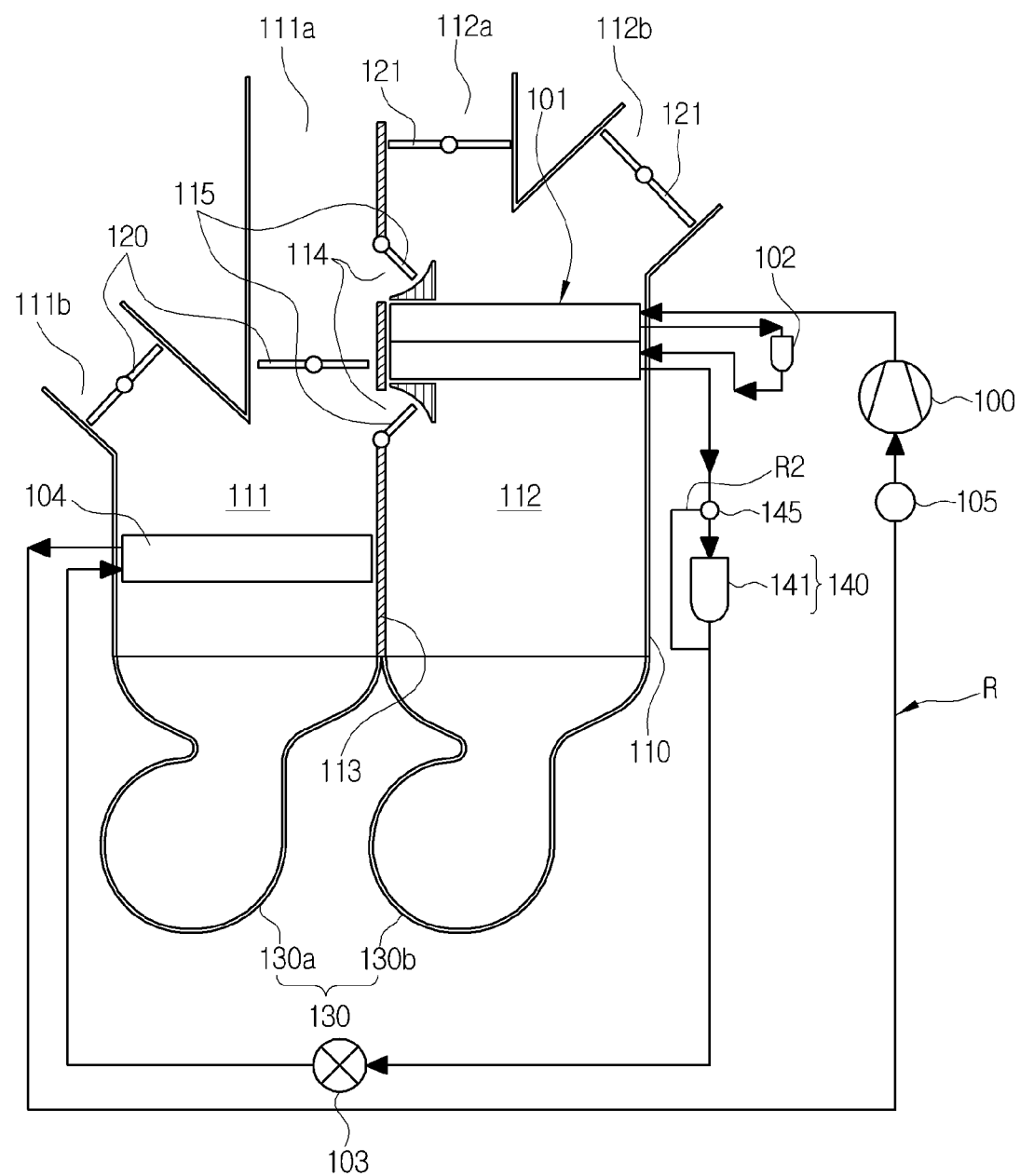
FIG. 16 is a view showing a state where the water-cooled condenser of FIG. 15 is omitted.

Moreover, as shown in FIGS. 15 and 16, pressure rising means 140 for rising refrigerant pressure of the system is mounted on the refrigerant circulation line (R) of the outlet side of the air-cooled condenser 101.

The pressure rising means 140 includes a receiver drier 141 which separates and stores the refrigerant circulating the refrigerant circulation line (R) into gas-phase refrigerant and liquid-phase refrigerant and discharges the liquid-phase refrigerant.

The receiver drier 141 is mounted on the refrigerant circulation line (R) between the air-cooled condenser 101 and the expansion means 103 and serves to store the liquid-phase refrigerant and serves as resistance to the refrigerant flowing through the refrigerant circulation line (R) so as to rise refrigerant pressure of the system and enhance heating performance.

Figure 17:
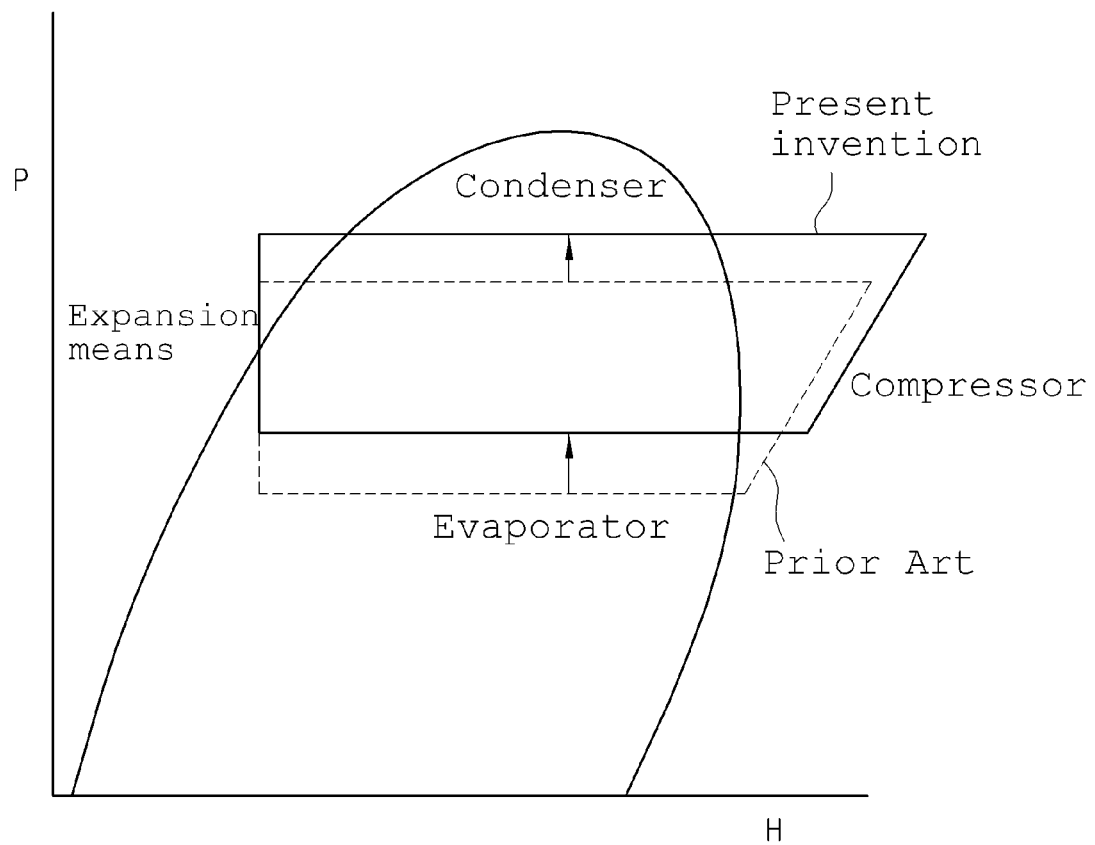
FIG. 17 is a P-H diagram of the heat pump system according to the present invention and the heat pump system according to the prior art.

FIG. 17 illustrates a P-H diagram of the heat pump system according to the present invention and the heat pump system according to the prior art. As you can see from FIG. 17, the heat pump system according to the present invention that the receiver drier 141 of the pressure rising means 140 is mounted on the refrigerant circulation line (R) of the outlet side of the air-cooled condenser 101 is moved up higher on the P-H diagram than the heat pump system according to the prior art which has no pressure rising means, so that heating performance is enhanced through refrigerant pressure rise of the system.

Furthermore, as shown in FIG. 15, a second bypass line (R2) is mounted on the refrigerant circulation line (R) to connect the refrigerant circulation line (R) of the inlet side and the refrigerant circulation line (R) of the outlet side of the receiver drier 141 of the pressure rising means 140 with each other so that the refrigerant bypasses the receiver drier 141.

A second direction-changing valve 145 is mounted at a branching point between the refrigerant circulation line (R) and the second bypass line (R2) to change a flow direction of the refrigerant.

That is, the second bypass line (R2) and the second direction-changing valve 145 make the refrigerant circulating the refrigerant circulation line (R) selectively pass the receiver drier 141 in order to enhance cooling and heating performance of the system.

In the meantime, as shown in FIG. 16, in the case that the pressure rising means 140 is mounted on the refrigerant circulation line (R), the water-cooled condenser 106 may be omitted. If the water-cooled condenser 106 is omitted, it is preferable that an auxiliary receiver drier 102 be mounted at one side of the air-cooled condenser 101.

Additionally, as shown in FIGS. 9 and 11 to 15, an auxiliary receiver drier 108 is mounted on the refrigerant circulation line (R) between the water-cooled condenser 106 and the air-cooled condenser 101 to separate and store the refrigerant, which flows after being discharged from the water-cooled condenser 106, into gas-phase refrigerant and liquid-phase refrigerant and to discharge the liquid-phase refrigerant.

Therefore, when the auxiliary receiver drier 108 is mounted between the water-cooled condenser 106 and the air-cooled condenser 101, the entire of the water-cooled condenser 106 mounted at the upstream side of the auxiliary receiver drier 108 is set as a condensing area, and the entire of the air-cooled condenser 101 mounted at the downstream side of the auxiliary receiver drier 108 is set as a supercooling area.

As described above, because the air-cooled condenser 101 mounted at the downstream side of the auxiliary receiver drier 108 can be utilized as the supercooling area, the heat pump system can enhance cooling performance by reducing temperature of the refrigerant further and prevent an excessive rise of temperature of the refrigerant discharged from the compressor 100 by lowering temperature of the refrigerant induced into the compressor 100 so as to enhance durability and stability of the heat pump system.

Meanwhile, in the heating mode, the refrigerant bypasses to the water-cooled condenser 106 and the auxiliary receiver drier 108 while flowing to the first bypass line (R1).

Figure 10:
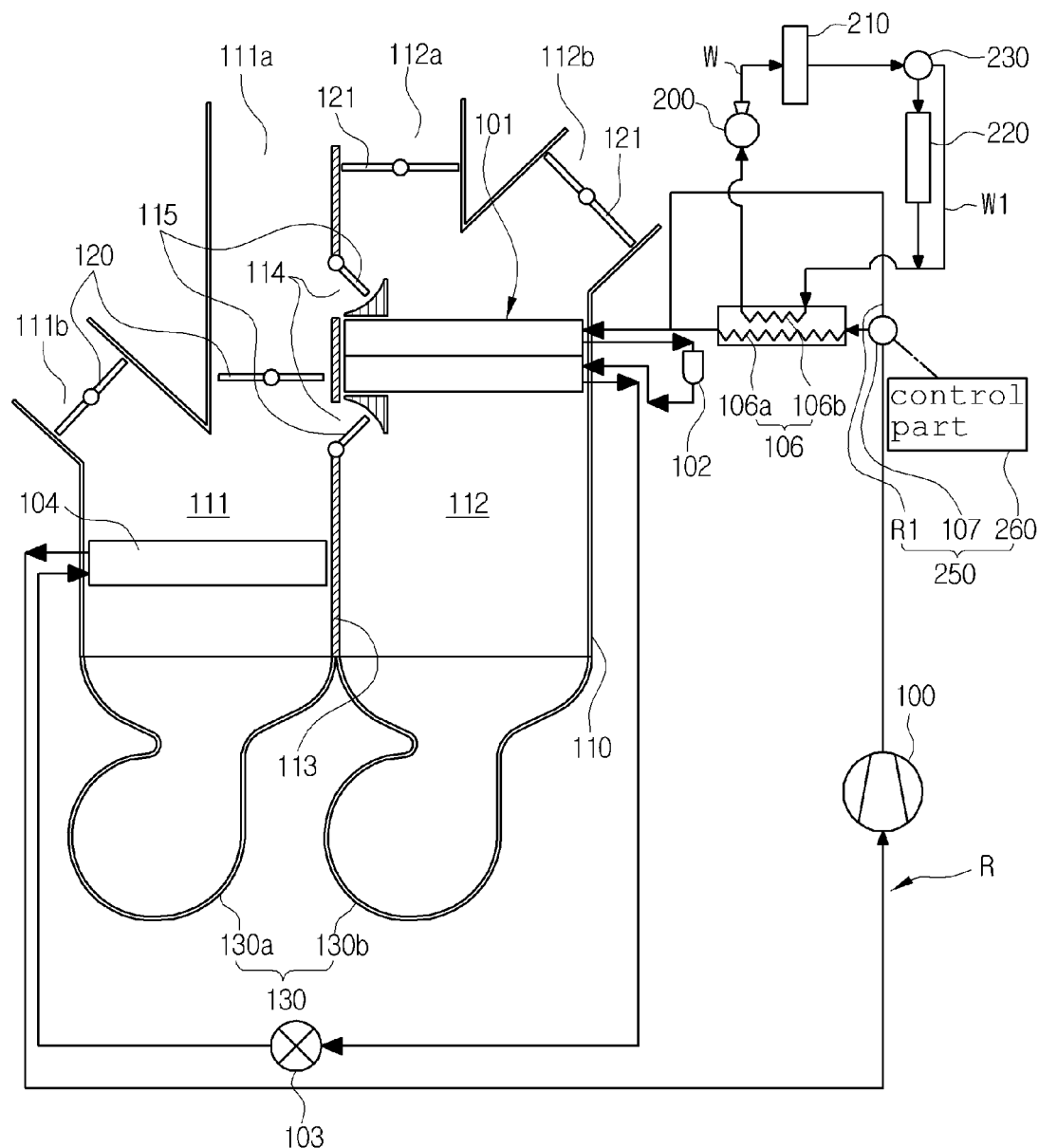
FIG. 10 is a view showing a state where an auxiliary receiver drier is connected to one side of an air-cooled condenser in FIG. 9.

In addition, the auxiliary receiver drier 102 may be mounted at another location. As shown in FIGS. 10 and 16, the auxiliary receiver drier 102 is connected and mounted to one side of the air-cooled condenser 101 to separate and store the refrigerant, which flows the air-cooled condenser 101, into gas-phase refrigerant and liquid-phase refrigerant and to discharge the liquid-phase refrigerant.

In other words, the air-cooled condenser 101 is divided into two heat exchange zones, and then, the auxiliary receiver drier 102 is connected to the refrigerant circulation line (R) which connects the two heat exchange zones with each other. In this instance, the upstream area of the auxiliary receiver drier 102 is set as the condensing area, and the downstream area of the auxiliary receiver drier 102 is set as the supercooling area.

Moreover, as shown in FIGS. 15 and 16, an accumulator 105 is mounted on the refrigerant circulation line (R) of the inlet side of the compressor 100.

The accumulator 105 separates and stores the refrigerant, which circulates the refrigerant circulation line (R), into gas-phase refrigerant and liquid-phase refrigerant and to discharge the gas-phase refrigerant toward the compressor 100.

As described above, the accumulator 105 supplies only the gas-phase refrigerant to the compressor 100 but blocks supply of the liquid-phase refrigerant in order to prevent damage of the compressor 100.

Hereinafter, a refrigerant circulation process of the heat pump system for the vehicle according to the present invention will be described, and for your convenience, as an example, the cooling mode of FIG. 11 will be described.

First, the gas-phase refrigerant of high-temperature and high-pressure compressed and discharged in the compressor 100 is induced to the refrigerant channel 106a of the water-cooled condenser 106.

The gas-phase refrigerant induced into the refrigerant channel 106a of the water-cooled condenser 106 exchanges heat with the coolant induced into the coolant channel 106b of the water-cooled condenser 106 while circulating the water-cooled radiator 210 and the electronic unit 220, and in this process, the refrigerant is liquefied while being cooled.

The refrigerant discharged from the water-cooled condenser 106 is induced into the auxiliary receiver drier 108 and is divided into the gas-phase refrigerant and the liquid-phase refrigerant, and then, the liquid-phase refrigerant is induced into the air-cooled condenser 101.

The refrigerant induced into the air-cooled condenser 101 exchanges heat with the air flowing the warm air passageway 112 of the air-conditioning case 110 to be cooled again, and then, is induced into the expansion means 103 to be decompressed and expanded.

The refrigerant decompressed and expanded in the expansion means 103 becomes an atomized state of low-temperature and low-pressure and is induced into the evaporator 104. The refrigerant induced into the evaporator 104 exchanges heat with the air flowing the cold air passageway 111 of the air-conditioning case to be evaporated.

After that, the refrigerant of low-temperature and low-pressure discharged from the evaporator 104 is induced into the compressor 100, and then, recirculates the above-mentioned refrigeration cycle.

In the meantime, in the heating mode, the refrigerant discharged from the compressor 100 bypasses the water-cooled condenser 106 and the auxiliary receiver drier 108 through the first bypass line (R1), and then, directly flows to the air-cooled condenser 101.

Hereinafter, air flow processes in the cooling mode and in the heating mode will be described.

A. Cooling Mode

In the cooling mode, as shown in FIGS. 7 and 11, the cold air mode door 120 opens the cold air outflow port 111a, and the warm air mode door 121 opens the warm air discharge port 112b.

Additionally, air is blown to the cold air passageway 111 and the warm air passageway 112 of the air-conditioning case 110 by the blower 130.

Continuously, the air blown to the cold air passageway 111 of the air-conditioning case 110 exchanges heat with the evaporator 104 to be changed into cold air, and then, is discharged to the interior of the vehicle through the cold air outflow port 111a to cool the interior of the vehicle.

Moreover, the air blown to the warm air passageway 112 of the air-conditioning case 110 is heated while passing the air-cooled condenser 101 so as to be changed into warm air, and then, the warm air is discharged to the exterior of the vehicle through the warm air discharge port 112b.

B. Heating Mode

In the heating mode, as shown in FIGS. 8 and 12, the cold air mode door 120 opens the cold air discharge port 111b, and the warm air mode door 121 opens the warm air outflow port 112a.

Furthermore, air is blown to the cold air passageway 111 and the warm air passageway 112 of the air-conditioning case 110 by the blower 130.

Continuously, the air blown to the cold air passageway 111 of the air-conditioning case 110 exchanges heat with the evaporator 104 to be changed into cold air, and then, is discharged to the exterior of the vehicle through the cold air discharge port 111b.

Additionally, the air blown to the warm air passageway 112 of the air-conditioning case 110 is heated while passing the air-cooled condenser 101 so as to be changed into warm air, and then, the warm air is discharged to the interior of the vehicle through the warm air outflow port 112a to heat the interior of the vehicle.

The invention claimed is:

1. A heat pump system for a vehicle which includes a compressor, an air-cooled condenser, expansion means and an evaporator connected with one another through a refrigerant circulation line, comprising:
   an air-conditioning case having a cold air passageway on which the evaporator is mounted and a warm air passageway on which the air-cooled condenser is mounted;
   a blower which is mounted on the air-conditioning case to blow air to the cold air passageway and the warm air passageway; and
   a water-cooled condenser which is mounted on the refrigerant circulation line between the compressor and the air-cooled condenser to exchange heat between refrigerant discharged from the compressor and coolant so as to condense the refrigerant;
   controlling means for controlling heat exchange between the refrigerant discharged from the compressor and the coolant according to the cooling mode and the heating mode;
   wherein the controlling means comprises:

a first bypass line which connects the refrigerant circulation line of the inlet side of the water-cooled condenser and the refrigerant circulation line of the outlet side of the water-cooled condenser with each other;

a first direction-changing valve which is mounted at a branching point between the first bypass line and the refrigerant circulation line to change a flow direction of the refrigerant; and a control part for controlling the first direction-changing valve according to the cooling mode and the heating mode; and wherein in the cooling mode, the control part controls the first direction-changing valve so that all of the refrigerant discharged from the compressor flows to the water-cooled condenser and to the air-cooled condenser and does not flow through the first bypass line, and wherein in the heating mode, the control part controls the first direction-changing valve so that the refrigerant discharged from the compressor flows toward the first bypass line and bypasses the water-cooled condenser.

2. The heat pump system according to claim 1, wherein a partition wall is formed inside the air-conditioning case to partition the inside of the air-conditioning case into the cold air passageway and the warm air passageway.

3. The heat pump system according to claim 1, wherein the blower comprises: a first blower which is mounted at an inlet side of the cold air passageway of the air-conditioning case to send air toward the cold air passageway; and a second blower which is mounted at an inlet side of the warm air passageway of the air-conditioning case to send air toward the warm air passageway.

4. The heat pump system according to claim 1, wherein the blower is a single blower which blows air toward the cold air passageway and the warm air passageway, respectively.

5. The heat pump system according to claim 4, wherein an air volume control door is mounted at the outlet side of the blower in order to control the air volume blown to the cold air passageway and the warm air passageway.

6. The heat pump system according to claim 1, wherein an outlet of the cold air passageway of the air-conditioning case comprises: a cold air outflow port for discharging the cold air passing the evaporator to the interior of the vehicle; and a cold air discharge port for discharging the cold air passing the evaporator to the exterior of the vehicle, and wherein an outlet of the warm air passageway of the air-conditioning case comprises: a warm air outflow port for discharging the warm air passing the air-cooled condenser to the interior of the vehicle; and a warm air discharge port for discharging the warm air passing the air-cooled condenser to the exterior of the vehicle.

7. The heat pump system according to claim 6, wherein the cold air outflow port and the warm air outflow port of the air-conditioning case are adjacent to each other.

8. The heat pump system according to claim 6, wherein cold air mode doors are respectively formed at the cold air outflow port and the cold air discharge port to adjust the degree of opening, and warm air mode doors are respectively disposed at the warm air outflow port and the warm air discharge port to adjust the degree of opening.

9. The heat pump system according to claim 2, wherein bypass passageways are formed in the partition wall to communicate the warm air passageway and the cold air passageway with each other, and bypass doors are respectively mounted on the bypass passageways to open and close the bypass passageways.

10. The heat pump system according to claim 9, wherein the bypass passageways are respectively formed in the partition walls of the upstream side and the downstream side of the air-cooled condenser.

11. The heat pump system according to claim 1, wherein the water-cooled condenser is mounted at the upstream side of the air-cooled condenser in an air flow direction inside the warm air passageway.

12. The heat pump system according to claim 1, wherein an internal heat exchanger which exchanges heat between the refrigerant discharged from the air-cooled condenser and the refrigerant discharged from the evaporator is mounted on the refrigerant circulation line.

13. The heat pump system according to claim 12, wherein the internal heat exchanger is mounted at the upstream side of the air-cooled condenser in the air flow direction inside the warm air passageway.

14. The heat pump system according to claim 1, further comprising: a coolant circulation line which is mounted to connect the water-cooled condenser and an electronic unit of the vehicle with each other to circulate the coolant, which circulates the electronic unit of the vehicle, to the water-cooled condenser; and a water pump which is mounted on the coolant circulation line to circulate the coolant.

15. The heat pump system according to claim 14, wherein the controlling means comprises a control part which controls the water pump according to the cooling mode and the heating mode to control a flow rate of the coolant circulating to the water-cooled condenser.

16. The heat pump system according to claim 15, wherein the control part, in the cooling mode, controls to turn on the water pump so that the coolant circulates toward the water-cooled condenser and, in the heating mode, controls to turn off the water pump so that the coolant does not circulate toward the water-cooled condenser.

17. The heat pump system according to claim 14, wherein a coolant bypass line is mounted on the coolant circulation line to connect the coolant circulation line of an inlet side of the electronic unit with the coolant circulation line of an outlet side, and wherein a coolant direction-changing valve is mounted at a branching point between the coolant bypass line and the coolant circulation line.

18. The heat pump system according to claim 1, wherein an auxiliary receiver drier is mounted on the refrigerant circulation line between the water-cooled condenser and the air-cooled condenser in order to separate and store the refrigerant, which flows after being discharged from the water-cooled condenser, into gas-phase refrigerant and liquid-phase refrigerant and to discharge the liquid-phase refrigerant.

19. The heat pump system according to claim 1, wherein an auxiliary receiver drier is connected and mounted at one side of the air-cooled condenser in order to separate and store the refrigerant, which flows the air-cooled condenser, into gas-phase refrigerant and liquid-phase refrigerant and to discharge the liquid-phase refrigerant.

20. The heat pump system according to claim 1, wherein pressure rising means for rising pressure of the refrigerant is mounted on the refrigerant circulation line of the outlet side of the air-cooled condenser.

21. The heat pump system according to claim 20, wherein the pressure rising means is a receiver drier which separates and stores the refrigerant circulating the refrigerant circulation line into gas-phase refrigerant and liquid-phase refrigerant and discharges the liquid-phase refrigerant.

22. The heat pump system according to claim 21, wherein a second bypass line is mounted on the refrigerant circulation line to connect the refrigerant circulation line of the inlet side and the refrigerant circulation line of the outlet side of the receiver drier with each other so that the refrigerant bypasses the receiver drier, and
 wherein a second direction-changing valve is mounted at a branching point between the refrigerant circulation line and the second bypass line to change a flow direction of the refrigerant.

23. A heat pump system for a vehicle which includes a compressor, an air-cooled condenser, expansion means and an evaporator connected with one another through a refrigerant circulation line, comprising:
 an air-conditioning case having a cold air passageway on which the evaporator is mounted and a warm air passageway on which the air-cooled condenser is mounted;
 a blower which is mounted on the air-conditioning case to blow air to the cold air passageway and the warm air passageway; and
 a water-cooled condenser which is mounted on the refrigerant circulation line between the compressor and the air-cooled condenser to exchange heat between refrigerant discharged from the compressor and coolant so as to condense the refrigerant;
 controlling means for controlling heat exchange between the refrigerant discharged from the compressor and the coolant according to the cooling mode and the heating mode;
 wherein the controlling means comprises:
 a first bypass line which connects the refrigerant circulation line of the inlet side of the water-cooled condenser and the refrigerant circulation line of the outlet side of the water-cooled condenser with each other;
 a first direction-changing valve which is mounted at a branching point between the first bypass line and the refrigerant circulation line to change a flow direction of the refrigerant; and
 a control part for controlling the first direction-changing valve according to the cooling mode and the heating mode; and
 wherein an auxiliary receiver drier is mounted on the refrigerant circulation line between the water-cooled condenser and the air-cooled condenser and is configured to separate and store the refrigerant after being discharged from the water-cooled condenser into gas-phase refrigerant and liquid-phase refrigerant and to discharge the liquid-phase refrigerant, so that the water-cooled condenser mounted at the upstream side of the auxiliary receiver drier functions as a condensing area, and the air-cooled condenser mounted at the downstream side of the auxiliary receiver drier functions as a supercooling area;
 wherein an inlet of the first bypass line is positioned between the compressor and the inlet side of the water-cooled condenser, and wherein an outlet side of the first bypass line is positioned between the auxiliary drier and the air cooled condenser.

\* \* \* \* \*